(12) United States Patent
Pyle et al.

(10) Patent No.: US 9,600,822 B2
(45) Date of Patent: Mar. 21, 2017

(54) STRUCTURED COMPUTER-ASSISTED METHOD AND APPARATUS FOR FILTERING INFORMATION PRESENTATION

(75) Inventors: David Pyle, Marietta, GA (US); Rick MacConnell, Norcross, GA (US)

(73) Assignee: AutoTrader.com, Inc., Atlanta, GA (US)

( * ) Notice: Subject to any disclaimer, the term of this patent is extended or adjusted under 35 U.S.C. 154(b) by 1875 days.

(21) Appl. No.: 11/565,147

(22) Filed: Nov. 30, 2006

(65) Prior Publication Data

US 2007/0185777 A1 Aug. 9, 2007

Related U.S. Application Data

(60) Provisional application No. 60/866,751, filed on Nov. 21, 2006, provisional application No. 60/743,237, filed on Feb. 6, 2006.

(51) Int. Cl.
*G06Q 30/00* (2012.01)
*G06Q 30/02* (2012.01)
*G06Q 30/06* (2012.01)

(52) U.S. Cl.
CPC ......... *G06Q 30/02* (2013.01); *G06Q 30/0625* (2013.01); *G06Q 30/0643* (2013.01)

(58) Field of Classification Search
CPC . G06Q 30/06; G06Q 30/0641; G06Q 30/0222
USPC .... 705/26, 27, 26.64, 26.8, 26.1, 27.1; 7/26, 7/27
See application file for complete search history.

(56) References Cited

U.S. PATENT DOCUMENTS

| 4,799,156 A | 1/1989 | Shavit et al. |
| 5,408,283 A | 4/1995 | Lee |
| 5,699,526 A | 12/1997 | Siefert |
| 5,721,906 A | 2/1998 | Siefert |
| 5,727,129 A | 3/1998 | Barrett et al. |
| 5,778,367 A | 7/1998 | Wesinger |

(Continued)

OTHER PUBLICATIONS

"AutoTrader.com Launches 'Find Your Dealer' Feature," press release, 1 page (May 17, 2006).

(Continued)

*Primary Examiner* — Brandy A Zukanovich
(74) *Attorney, Agent, or Firm* — Nixon & Vanderhye P.C.

(57) ABSTRACT

Information is gathered from merchants such as car dealers by online forms or other means soliciting particular differentiating factors such as services and specialties (e.g., languages spoken, financing options, other information). When a consumer desires to perform a search, he or she is asked by the exemplary illustrative non-limiting implementation to input a geographical location. The illustrative exemplary non-limiting implementation may then access the merchant database and retrieve listings that comply with the geographical restraint the user requested. Those listings may be further filtered based on the user's specification of additional constraints related to specialties and/or servicesBy conveniently selecting such options (e.g., in one implementation, by simply checking a box on a web page), the users can be automatically presented with a new, filtered listing that lists only those merchants meeting the predetermined criteria the user has specified.

19 Claims, 20 Drawing Sheets

(56) References Cited

U.S. PATENT DOCUMENTS

| | | | |
|---|---|---|---|
| 5,803,500 A | 9/1998 | Mossberg | |
| 5,818,914 A | 10/1998 | Fujisaki | |
| 5,835,896 A | 11/1998 | Fisher | |
| 5,842,178 A * | 11/1998 | Giovannoli | 705/26 |
| 5,845,265 A | 12/1998 | Woolston | |
| 5,890,138 A | 3/1999 | Godin | |
| 5,905,974 A | 5/1999 | Fraser et al. | |
| 5,951,643 A | 9/1999 | Shelton et al. | |
| 5,954,798 A | 9/1999 | Shelton et al. | |
| 5,987,440 A | 11/1999 | O'Neil | |
| 6,012,045 A | 1/2000 | Barzilai | |
| 6,021,398 A | 2/2000 | Ausubel | |
| 6,023,686 A | 2/2000 | Brown | |
| 6,026,403 A | 2/2000 | Siefert | |
| 6,044,363 A | 3/2000 | Mori | |
| 6,055,518 A | 4/2000 | Franklin | |
| 6,058,379 A | 5/2000 | Odom | |
| 6,058,417 A | 5/2000 | Hess | |
| 6,085,169 A | 7/2000 | Walker | |
| 6,085,176 A | 7/2000 | Woolston | |
| 6,085,179 A | 7/2000 | Halm | |
| 6,108,639 A | 8/2000 | Walker | |
| 6,151,589 A | 11/2000 | Aggarwall | |
| 6,151,601 A | 11/2000 | Papierniak et al. | |
| 6,167,386 A | 12/2000 | Brown | |
| 6,202,051 B1 | 3/2001 | Woolston | |
| 6,216,114 B1 | 4/2001 | Alaia et al. | |
| 6,223,167 B1 | 4/2001 | Alaia | |
| 6,243,691 B1 | 6/2001 | Fisher et al. | |
| 6,249,772 B1 | 6/2001 | Walker | |
| 6,266,652 B1 | 7/2001 | Godin | |
| 6,269,343 B1 | 7/2001 | Pallakoff | |
| 6,275,821 B1 | 8/2001 | Danish et al. | |
| 6,285,989 B1 | 9/2001 | Shoham | |
| 6,324,538 B1 | 11/2001 | Wesinger, Jr. | |
| 6,332,129 B1 | 12/2001 | Walker | |
| 6,356,878 B1 | 3/2002 | Walker | |
| 6,366,891 B1 | 4/2002 | Feinberg | |
| 6,381,594 B1 | 4/2002 | Eichstaedt | |
| 6,408,283 B1 | 6/2002 | Alaia | |
| 6,415,264 B1 | 7/2002 | Walker et al. | |
| 6,415,269 B1 | 7/2002 | Dinwoodie | |
| 6,415,270 B1 | 7/2002 | Rackson | |
| 6,415,320 B1 | 7/2002 | Hess | |
| 6,480,855 B1 | 11/2002 | Siefert | |
| 6,489,980 B1 | 12/2002 | Scott et al. | |
| 6,502,096 B1 | 12/2002 | Siefert | |
| 6,519,600 B1 | 2/2003 | Siefert | |
| 6,546,425 B1 | 4/2003 | Hanson et al. | |
| 6,850,940 B2 | 2/2005 | Wesinger | |
| 6,865,575 B1 | 3/2005 | Smith et al. | |
| 6,934,634 B1 | 8/2005 | Ge | |
| 7,028,002 B2 | 4/2006 | Wakabayashi et al. | |
| 7,130,815 B1 | 10/2006 | Gupta | |
| 7,461,022 B1 | 12/2008 | Churchill et al. | |
| 2001/0027433 A1 | 10/2001 | Fujiwara et al. | |
| 2001/0034694 A1 | 10/2001 | Elias | |
| 2001/0037281 A1 | 11/2001 | French et al. | |
| 2002/0042769 A1 | 4/2002 | Gujral et al. | |
| 2002/0065707 A1 * | 5/2002 | Lancaster et al. | 705/10 |
| 2002/0065763 A1 | 5/2002 | Taylor et al. | |
| 2002/0073158 A1 | 6/2002 | Dalal et al. | |
| 2002/0103740 A1 | 8/2002 | Maroney | |
| 2002/0116287 A1 | 8/2002 | Schubert et al. | |
| 2002/0147663 A1 | 10/2002 | Walker et al. | |
| 2002/0188551 A1 | 12/2002 | Grove et al. | |
| 2003/0110047 A1 | 6/2003 | Santosuosso | |
| 2003/0135425 A1 | 7/2003 | Leavitt | |
| 2004/0030689 A1 * | 2/2004 | Anderson et al. | 707/3 |
| 2004/0059596 A1 | 3/2004 | Vaidyanathan et al. | |
| 2004/0128224 A1 * | 7/2004 | Dabney et al. | 705/37 |
| 2004/0199496 A1 | 10/2004 | Liu et al. | |
| 2004/0236690 A1 | 11/2004 | Bogosian et al. | |
| 2005/0021444 A1 | 1/2005 | Bauer et al. | |
| 2005/0278309 A1 * | 12/2005 | Evans et al. | 707/3 |
| 2005/0289043 A1 | 12/2005 | Maudlin | |
| 2006/0026071 A1 | 2/2006 | Radwin | |
| 2006/0122812 A1 * | 6/2006 | Tinseth | 702/188 |
| 2006/0195428 A1 | 8/2006 | Peckover | |
| 2007/0073758 A1 * | 3/2007 | Perry et al. | 707/102 |

OTHER PUBLICATIONS

Advanced Froogle Search—Ford Dealers, 5 pages (Sep. 24, 2006).
Google Search—22203 Ford Dealers, 2 pages (Sep. 23, 2006).
Yahoo Search—Ford Roswell, 3 pages (Sep. 22, 2006).
Google Search—Ford Roswell, 2 pages (Sep. 22, 2006).
Jeff D. Opdyke, "How You Can Haggle for That Ride . . . ," Book Excerpt, The Wall Street Journal Online, 3 pages (Apr. 16, 2006).
"Break down," The Economist, 2 pages (May 20, 1999).
Riva Richmond, "Click Here for Neighborhood Guide, Google, Yahoo Tweak Their 'Local Services' in a Bid to Attract Consumers," The Wall Street Journal Online, 3 pages (Apr. 27, 2006).
Yahoo Auctions Tour, http://auctions.yahoo.com, (copyright 2002).
ebay Help: Community Standards :Policies and conduct, Real Estate Rules, Transaction Interference, Non-Binding Bid Policy, http://pages.ebay.com/help (copyright 1995-2003).
Auction-Style Listings powered by AutoTrader.com, Coming in 2003!, http://ads.autotrader.com/auctionstyle/demo.html.
eBay annual report filed Mar. 31, 2003.
Office Action dated Jun. 13, 2008 in related copending U.S. Appl. No. 10/659,746.
Office Action dated Mar. 4, 2009 in related copending U.S. Appl. No. 10/659,746.
Advisory Action dated Sep. 15, 2009 in related copending U.S. Appl. No. 10/659,746.
Office Action dated Nov. 3, 2009 in related copending U.S. Appl. No. 10/659,746.
Office Action dated Feb. 2, 2010 in related copending U.S. Appl. No. 10/659,746.
Office Action dated Jun. 7, 2010 in related copending U.S. Appl. No. 10/659,746.

* cited by examiner

Example overall System Architecture

Example Overall System Flowchart

FIG. 4B
FIG. 4A

FIG. 4C

Dealership Search results

We found 400 dealership located within 25 miles from ZIP 30076 for Honda Accord

Email A Friend
Print This Page

Page 1 of 10
<Previous 1 2 3 4 5 6 7 Next>
Listings per page 40

[Search Again]

Sort by: Distance

Services & Specialities

Change your results.

Financing
- ☐ Special Rate Financing (10)
- ☐ Low Credit Score Financing (2)
- ☐ Financing for Credit-Challenged (0)

Services
- ☐ Service Center (66)
- ☐ Factory Authorized Service Center (82)
- ☐ Body Shop (35)
- ☐ Customization (4)
- ☐ Detailing (41)
- ☐ Parts & Accessories (19)
- ☐ Concierge (3)
- ☐ Delivery Options (38)
- ☐ Courtesy Shuttle (30)
- ☐ Loaner Cars (30)
- ☐ Rental cars (32)

Vehicle Inventory
- ☐ New (16)
- ☐ Used (82)
- ☐ Certified (85)
- ☐ Mobility (16)
- ☐ Classic/Collector (56)
- ☐ Work/Heavy Duty (41)
- ☐ Conversion Vans (36)

Auto's Auto's More Info
1 mile from 30076
Get Phone Number
xxxxxxxx
xxxxxxxxx
yyyyyyyyyy yy zzzz
We Speak Spanish
⊞ View 15 Service & Specialities

Atlanta Honda
3 miles from 30076
Get Phone Number
xxxxxxxx
xxxxxxxxx zzzz
⊞ View 15 Services & Specialities

Ford Dealer
More info
5 miles 30076
Get Phone Number
xxxxxxxx
xxxxxxxxx zzzz
YYYYYY
⊞ View 15 Services & Specialities

Truck Sales More Info
2 mile from 30076
Get Phone Number
xxxxxxxx
xxxxxxxxx
yyyyyyyyyy yy zzzz
- Special Rate Financing
- Low Credit Score Financing
- Financing for Credit-Challenged
- Service Center
- Body Shop
- Concierge
- Detailing
- Parts & Accessories
- Delivery options
- Hybrid/Fuel Efficient Vehicles ⊟ Hide 10 Services & Specialities

Carr Auto Sale More Info
4 miles from 30076
xxxx yyy xxx
zzzz xx
ZZZZZZZ
⊞ View 5 Services & Specialities

Truck Sales More Info
7 mile from 30076
Get Phone Number
xxxxxxxx
xxxxxxxxx
yyyyyyyyyy yy zzzz

FIG. 4D

Find Your Dealer Search Results - AutoTrader.com

Join now! Member br

Research & Compare   Find Your Car   Sell Your Car   New Cars   Car Loans   Insurance home > Find Your Dealer > Dealer Results                                                            Visitor Agreemen

Dealership Search Results

Em
Pri

We found 30 dealerships located within 25 miles of ZIP code 22205 for play area.

< Previ

Search Again

Listings per

| Services & Specialties | Sort by: Distance | ⊞ View All Servic |
|---|---|---|
| Change your results<br>Financing<br>☐ Good Credit (20)<br><br>☐ Bad Credit (22)<br><br>☐ No Credit (19)<br><br>Special Offers<br>☐ New Car Specials (25)<br><br>☐ Used Car Specials (30)<br><br>☐ Dealer Specials (5)<br><br>☐ Manufacturer Rebates and Incentives (2)<br><br>Services<br>☐ Service Center (15)<br><br>☐ Factory Authorized Service Center (24)<br><br>☐ Body Shop (13)<br><br>☐ Customization (7)<br><br>☐ Detailing (15)<br><br>☐ Parts & Accessories (24)<br><br>☐ Concierge (2)<br><br>☐ Delivery Options (20)<br><br>☐ Courtesy Shuttle (16)<br><br>☐ | Brown's Arlington Honda More info<br>2 Miles from ZIP<br><br>Call Sales & Service at: 1-866-615-1560<br>3920 Lee Highway<br>Arlington, VA 22207<br><br>• Service Center    • Comfortable Waiting Area<br>• Factory Authorized Service Center    • Children's Play Area<br>• Loaner Cars    • Delivery Options<br>• Parts & Accessories    • Español<br>• Courtesy Shuttle    • Good Credit<br>• Detailing    • Bad Credit<br>• Internet Access    • No Credit<br>• Handicapped Accessible<br><br>⊞ View 15 Services & Specialties<br><br>Rosenthal Landmark Honda More info<br>5 Miles from ZIP<br><br>Call Sales & Service at: 1-800-604-6821<br>5125 Duke Street<br>Alexandria, VA 22304<br><br>• Service Center    • Children's Play Area<br>• Factory Authorized Service Center    • Delivery Options<br>• Loaner Cars    • Español<br>• Parts & Accessories    • Good Credit<br>• Detailing    • Bad Credit<br>• Internet Access    • No Credit<br>• Handicapped Accessible    • Hybrid<br>• Comfortable Waiting Area<br><br>⊞ View 15 Services & Specialties<br><br>J Koons Pontiac GMC More Info<br>7 Miles from ZIP<br><br>Call Sales & Service at: 1-866-865-3279<br>2050 Chain Bridge Road | Ourisman World of Ford More info<br>5 Miles from ZIP<br><br>Call Sales & Service at: 1-866-378-6<br>6129 Richmond Highway<br>Alexandria, VA 22302<br><br>• Service Center    • Delivery<br>• Factory Authorized Service Center    • Español<br>• Loaner Cars    • Good C<br>• Parts & Accessories    • Bad Cre<br>• Courtesy Shuttle    • No Cred<br>• Internet Access    • Commer<br>• Comfortable Waiting Area    • Convers<br>• Children's Play Area<br><br>⊞ View 15 Services & Specialties<br><br>Koons Tysons Toyota & Scion Mc<br>7 Miles from ZIP<br><br>Call Sales & Service at: 1-888-331-6<br>8610 Leesburg Pike<br>Vienna, VA 22182<br>Loaner Cars Availabl<br><br>• Service Center    • Comfort Area<br>• Factory Authorized Service Center    • Children<br>• Body Shop    • Delivery<br>• Loaner Cars    • Español<br>• Parts & Accessories    • Handica<br>• Courtesy Shuttle    • Classic/<br>• Detailing    • Hybrid<br>• Business Center<br><br>⊞ View 15 Services & Specialties<br><br>Moore Cadillac Hummer Tysons Corner More info<br>7 Miles from ZIP<br><br>Call Sales & Service at: |

FIG. 4E

Find Your Dealer Search Results - AutoTrader.com    Page 1 of 5

Join now! Member be

Research & Compare   Find Your Car   Sell Your Car   New Cars   Car Loans   Insurance Home > Find Your Dealer > Dealer Results Visitor Agreemen:

Dealership Search Results

Em
Pri:

We found 30 dealerships located within 25 miles of ZIP code 22205 for play area.

< Previ:

[ Search Again ]

Listings per

Services & Specialties

Change your results
Financing
☐ Good Credit (20)
☐ Bad Credit (22)
☐ No Credit (19)

Special Offers
☐ New Car Specials (25)
☐ Used Car Specials (30)
☐ Dealer Specials (5)
☐ Manufacturer Rebates and Incentives (2)

Services
☐ Service Center (15)
☐ Factory Authorized Service Center (24)
☐ Body Shop (13)
☐ Customization (7)
☐ Detailing (15)
☐ Parts & Accessories (24)
☐ Concierge (2)
☐ Delivery Options (20)
☐ Courtesy Shuttle (16)
☐

Sort by: Dealership Name

⊞ View All Servic

A-1 Imports More info
17 Miles from ZIP

Call Sales & Service at: 1-866-410-9544
15551 Frederick Road
Rockville, MD 20855

- Service Center
- Courtesy Shuttle
- Business Center
- Handicapped Accessible
- Children's Play Area
- Delivery Options
- Español
- Good Credit
- Bad Credit
- No Credit ⊞ View  10 Services & Specialties

Brown's Arlington Honda More info
2 Miles from ZIP

Call Sales & Service at: 1-866-615-1560
3920 Lee Highway
Arlington, VA 22207

- Service Center
- Factory Authorized Service Center
- Loaner Cars
- Parts & Accessories
- Courtesy Shuttle
- Detailing
- Internet Access
- Handicapped Accessible
- Comfortable Waiting Area
- Children's Play Area
- Delivery Options
- Español
- Good Credit
- Bad Credit
- No Credit ⊞ View  15 Services & Specialties

Brown's Sterling Nissan
More info
18 Miles from ZIP

Call Sales & Service at:
1-866-803-7571

Antwerpen Toyota More info
24 Miles from ZIP

Call Sales & Service at: 1-866-864-9
12420 Auto Drive
Clarksville, MD 21029

- Factory Authorized Service Center
- Loaner Cars
- Rental Cars
- Parts & Accessories
- Courtesy Shuttle
- Detailing
- Customization
- Business Center
- Comfort: Area
- Children
- Español
- Good Cr
- Bad Cre
- No Cred
- Hybrid ⊞ View  15 Services & Specialties

Brown's Manassas VW
More info
20 Miles from ZIP

Call Sales & Service at: 1-866-210-3
9346 Mathis Ave
Manassas, VA 20110

- Factory Authorized Service Center
- Loaner Cars
- Rental Cars
- Parts & Accessories
- Detailing
- Comfort: Area
- Children
- Español ⊞ View  8 Services & Specialties

Darcars Chrysler Jeep Dodge of I Carrollton More info
14 Miles from ZIP

Call Sales & Service at: 1-800-264-0
8100 Annapolis Road

FIG. 4F

Find Your Dealer Search Results - AutoTrader.com

AutoTrader.com

<u>Join now!</u> Member b(

Research & Compare | Find Your Car | Sell Your Car | New Cars | Car Loans | Insurance <u>Home</u> > <u>Find Your Dealer</u> > Dealer Results
Visitor Agreemen

Dealership Search Results

Em
Pri

We found 30 dealerships located within 25 miles of ZIP code 22205 for play area.

< Previ

[Search Again]
Listings per

| Services & Specialties | Sort by: # of Services & Specialties | ⊞ View All Servic |
|---|---|---|
| Change your results | | |
| Financing | | |
| ☐ Good Credit (20) | | |
| ☐ Bad Credit (22) | | |
| ☐ No Credit (19) | | |

Ourisman Honda Volkswagen <u>More info</u>
24 Miles from ZIP

Call Sales & Service at:
1-866-387-3081
3371 Fort Meade Road
Laurel, MD 20724

Bad Credit? We Can Help!

- Factory Authorized Service Center
- Body Shop
- Loaner Cars
- Parts & Accessories
- Detailing
- Customization
- Business Center
- Internet Access
- Comfortable Waiting Area
- Children's Play Area
- Delivery Options
- Good Credit
- Bad Credit
- No Credit
- Hybrid ⊞ <u>View</u> 15 Services & Specialties

Miller Toyota <u>More info</u>
20 Miles from ZIP

Call Sales & Service at:
1-800-791-3568
8566 Sudley Road
Manassas, VA 20110

Hablamos español.

- Factory Authorized Service Center
- Loaner Cars
- Parts & Accessories
- Courtesy Shuttle
- Business Center
- Internet Access
- Handicapped Accessible
- Comfortable Waiting Area
- Children
- Delivery
- Español
- 中文
- Good Cr
- No Cred
- Hybrid ⊞ <u>View</u> 15 Services & Specialties

Special Offers
☐ New Car Specials (25)
☐ Used Car Specials (30)
☐ Dealer Specials (5)
☐ Manufacturer Rebates and Incentives (2)

Services
☐ Service Center (15)
☐ Factory Authorized Service Center (24)
☐ Body Shop (13)
☐ Customization (7)
☐ Detailing (15)
☐ Parts & Accessories (24)
☐ Concierge (2)
☐ Delivery Options (20)
☐ Courtesy Shuttle (16)
☐

Koons Tysons Toyota & Scion <u>More info</u>
7 Miles from ZIP

Call Sales & Service at: 1-888-331-6423
8610 Leesburg Pike
Vienna, VA 22182

Loaner Cars Available!

- Service Center
- Factory Authorized Service Center
- Body Shop
- Loaner Cars
- Parts & Accessories
- Courtesy Shuttle
- Detailing
- Business Center
- Comfortable Waiting Area
- Children's Play Area
- Delivery Options
- Español
- Handicap-Equipped
- Classic/Collector
- Hybrid ⊞ <u>View</u> 15 Services & Specialties

Jaguar-Land Rover of West Colur
<u>More info</u>
24 Miles from ZIP

Call Sales & Service at: 1-866-500-9
12500 New Car Sales Drive
Clarksville, MD 21029

- Factory Authorized Service Center
- Body Shop
- Loaner Cars
- Parts & Accessories
- Detailing
- Customization
- Handicapped Accessible
- Comfortable Waiting Area
- Children
- Delivery
- ΞΣΞ
- Good Cr
- Bad Cre
- No Cred
- Handica ⊞ <u>View</u> 15 Services & Specialties

FIG. 4G

*AutoTrader*.com
We mean business.

Welcome Redlands Auto Center

You are logged in as pyled   Logout   Admin Navigation   Dealer Search History   tools

- home
- tools
- contact us

Edit Service & Specialties

[ Dealer Info ] [ Service & Specialties ] [ Billing Summary ]

- Ad Manager
- View Inventory
- Search Inventory
- Add Inventory
- Add Photos
- Edit Dealer Info
- Available Ads
- Product Manager
- Activity Report
- Specials

SERVICE & SPECIALTIES

Select up to 15 services and specialities below. To order more and specialties, contact Customer service.

| SERVICE & SPECIALTIES | * PROMINENT SERVICE & SPECIALTY |
|---|---|
| | ⊙ I do not want a Prominent Service & Specialty. |

Financing
- ☐ Good Credit   ○
- ☐ Bad Credit   ○
- ☐ No Credit   ○

Services
- ☐ Service Center   ○
- ☐ Factory Authorized Service Center   ○
- ☐ Body Shop   ○
- ☐ Customization   ○
- ☐ Detailing   ○
- ☐ Parts & accessories   ○
- ☐ Concierge   ○
- ☐ Delivery Options   ○
- ☐ Courtesy Shuttle   ○
- ☐ Loaner Cars   ○
- ☐ Rental Cars   ○

Vehicle Inventory
- ☐ Classic/Collector   ○
- ☐ Conversion Vans   ○
- ☐ Handicap-Equipped   ○
- ☐ Hybrid   ○
- ☐ Cpmmercial/Fleet   ○

Language(s) Spoken What will consumers see?
- ☐ American Sign Language   ○
- ☐ Chinese   ○
- ☐ French   ○
- ☐ German   ○
- ☐ Italian   ○
- ☐ Korean   ○
- ☐ Polish   ○
- ☐ Russian   ○
- ☐ Spanish   ○
- ☐ Tagalog   ○
- ☐ Vietnamese   ○

Amenities
- ☐ Business Center   ○
- ☐ Children's Play Area   ○
- ☐ Comfortable Waiting Area   ○
- ☐ Handicapped Accessible   ○
- ☐ Internet Access   ○

( save changes )

By using this service, you accept the terms of our Visitor Agreement.   ⌐ 1308

FIG. 5A

XYZ's Honda          Email A friend ✉
Printable Version 🖨

New 2005 Honda Accord - 105 in Stock
Price Range - All Price

Page 1 of 5

[Back to Results]   [Modify Search]   <Previous 1 2 3 4 5 Next>

About This Dealership 5775 xxxx uuu xxx
YYYYY
Get Driving Directions

Call Toll Free: 1-800-xxx-xxxx

Visit Our Website
Email Us
Get Dealership Financing

Exact Matches - Cars that match all your search options

| 2005 New | Honda Accord | 10 Mileage | $ 30,00 $ 31,000 MSRP | 20mi from Zip |

6 Photos

Honda Accord

Dual Zone Climate Controls-Driver And Passenger, Electric Power Steering, Ventilated Front Disc/Solid Rear Disc, Power Windows, Tilt and Telesopic St...

Toll Free: 1-800-xxx-yyyy

VIN 12345678ABCD
Body Style: Sedan
Engine: 4Cylinder
Doors Four Doors

| 2005 New | Honda Accord | 2 Mileage | $ 30,000 $ 32,000 MSRP | 25mi from ZIP |

27 Photos

Color - DesertMist

Dual Zone Climate Controls-Driver and Passenger
Electric Power Steering, Ventilated Front Disc ? Solid
Rear Disc, Power Windows, Tilt and Telescopic St....

25mi from ZIP

VIN 12345678xxxyy

Body Style: Sedan
Engine: 6 Cylinder
Doors: Four Door

FIG. 14

STRUCTURED COMPUTER-ASSISTED METHOD AND APPARATUS FOR FILTERING INFORMATION PRESENTATION

CROSS-REFERENCES TO RELATED APPLICATIONS

This application claims the benefit of Provisional Application No. 60/743,237 filed 6 Feb. 2006; and Provisional Application No. 60/866,751 filed Nov. 21, 2006; the contents of which are incorporated herein by reference.

FIELD

The technology herein relates to information retrieval and presentation, and more particularly to method and apparatus for filtering information based on user selection between predetermined criteria. Still more particularly, the technology herein provides illustrative non-limiting exemplary implementations that allow users to rapidly and efficiently find, view and evaluate differentiating information concerning merchants including but not limited to car dealers.

BACKGROUND AND SUMMARY

The world wide web has been a boon to well-informed consumers. Some consumers purchase goods and services over the web. Many more use the World Wide Web as a source of comparative shopping information. Pricing and other information difficult to obtain just a few years ago is now freely available.

As one non-limiting example relating to the new and used car market, a variety of web sites now offer detailed consumer information comparing the dealer's invoice cost against the Manufacturer's Suggested Retail Price (MSRP) printed on the window sticker of the vehicle. The National Automobile Dealer's Association website, the Kelley Blue Book website, the Edmunds website and other sources provide such information. Some of these sources provide not only a detailed analysis of MSRP but also invoice prices showing what consumers are paying for a particular model of car in a particular geographical region. Price and feature comparison information by car model (both new and used) are readily available, See "How You Can Haggle For That Ride" (Wall Street Journal Apr. 16, 2006). Consumers are far more informed as a result.

Despite many attempts at direct merchandising over the Internet, it appears that few buyers actually want to use the Internet to close deals for "big ticket" items such as cars, trucks, boats and real estate. Most consumers want to "kick the tires" or otherwise inspect the item they are thinking of purchasing. Nevertheless, especially for expensive items, many consumers do a fair amount of research from their Internet-connected computer at home or in a public library before visiting a prospective merchant to make a purchase. The increased information readily available to consumers has had profound impacts on the way merchants and manufacturers market their goods and services, See e.g., "Break Down" (The Economist May 20, 1999).

Generally speaking, every Ford dealership across the country has access to essentially the same pool of new Ford vehicles. Similarly, every Honda dealership has access to essentially the same pool of new Honda vehicles. Most consumers are now aware that dealer cost and local pricing information is now readily available, and would not dream of going into a merchant without first knowing what the merchant is paying for items such as automobiles and what the expected markup will be. As base pricing has become more open and equalized, merchants such as car dealerships have responded to the changing marketplace by competing on aspects of their business other than price and specific products offered. Additional differentiating factors can make the difference between a successful merchant with high sales volumes and a less successful dealer with lower sales volumes.

It might at first appear that essentially the only effective way for dealerships to compete for consumer dollars would be based on location and available inventory. Certainly, these factors are important to consumers. However, it is common especially in medium to large-sized metropolitan areas for car dealerships to attempt to differentiate themselves from their competitors based on a wide array of additional distinguishing characteristics. For example, car dealerships have long competed based on the competence and track record of their service departments. Some car dealerships have excellent service departments that a consumer can benefit from long after he or she purchases a new or used vehicle from the dealership. In addition, however, in a geographical region having a high concentration of Latinos, a car dealership employing Spanish-speaking sales staff may enjoy a significant advantage over dealerships whose sales staff speaks only English. Some car dealerships are able to offer creative financing that allows purchasers with poor or no credit to nevertheless purchase a vehicle. To a young family shopping for a new minivan, it may make a difference whether a car dealership has a playroom or similar facility the kids can play in while the parents shop.

Car dealerships and other merchants are by no means shy about touting their differentiating factors in print, radio and television advertising. Since merchants know many prospective buyers do much of their initial research on the Internet, merchants often also make sure their websites clearly convey such information. Special capabilities such as "children's play room" or "se habla espanol" are therefore often prominently featured on merchant Internet websites, and can also be included in so-called web page "metadata" to help ensure the information is harvested by search engine "bots" and used when users perform Internet searches.

While existing world wide web search engines such as GOOGLE™ and YAHOO® are very powerful and highly useful, they sometimes don't also provide comprehensive useful results efficiently to inexperienced users. For example, a consumer in the Atlanta area might input phrases such as "Ford" and "Roswell" to try to see web pages of Ford dealers in Roswell Ga. Some of the pages obtained by such a search may be the home pages of car dealers in Roswell Ga., but other returned listings may reference car dealerships in Roswell S. Dak. Still other retrieved links might reference individual cars for sale in Roswell. Still other links might reference general merchant listings. Furthermore, such searches might return literally millions of links—far too many for the user to sort through easily.

Recently released so-called "local listing" functionality that lists a variety of merchants in a localized geographical area (e.g., "local results for Ford dealers near Arlington Va.") along with maps directing consumers to selected business establishments can help. See e.g. "Click Here for the Neighborhood Guide" (Wall Street Journal Apr. 27, 2006). However, despite the power and effectiveness of such commonly available web searching tools, consumers can sometimes feel overwhelmed by the amount of information retrieved by a world wide web search.

In particular, it is sometimes difficult for some consumers to find merchant differentiating factors that are important to them. For example, the young family who may be attracted to a dealership with a play room may need to conduct several web searches putting in alternative terms such as "playroom," "play room", "nursery," "children," and the like before comprehensive responsive information will be returned. Furthermore, a parent with young children conducting such a search would need to know beforehand that some dealerships have children's playrooms. Requiring a consumer to know what information he or she is looking for before he or she can find it may sound logical, but many consumers are not particularly computer literate and may need a bit more direction.

It is of course possible for consumers interested in visiting a merchant to use online search facilities to locate the websites of nearby merchants and then view the different websites individually to try and match up their consumer preferences with the features offered by the different merchants. While such a research process can provide useful information, it can also be time consuming. Typically, different merchants list information entirely differently on their individual websites. Some merchants have extensive websites, other merchants have more minimal websites and still others may not have any website at all. Furthermore, it is often useful for a consumer to be able to view in-stock inventory as part of the same research process (e.g., to find a close-by merchants offering particular types of financing or other features and to have certain number of items of a certain type in stock to chose from). Therefore, further improvements are desirable.

The illustrative exemplary non-limiting technology herein provides innovative ways for a consumer or other user to compare merchants based on differentiating characteristics such as for example services and/or specialties offered.

In one exemplary illustrative non-limiting implementation, information is gathered from merchants by requesting the merchants to fill out online or other information request forms. Such information request forms solicit specific information concerning particular differentiating factors such as services and specialties the merchants offer. For example, merchants may be asked to specify particular languages spoken by their sales staff, to identify particular amenities, to specify particular financing arrangements offered, and other such specialties and/or services. Such information is then inputted into a database in a form that is rapidly searchable.

When a consumer desires to perform a search, he or she is asked by the exemplary illustrative non-limiting implementation to input a geographical location such as for example zip code. The consumer may also specify a desired range (egg., "within 25 miles"). The illustrative exemplary non-limiting implementation may then access the merchant database and retrieve listings that comply with the geographical restraint the user requested. In addition, those listings may be further filtered based on the user's specification of additional constraints related to specialties and/or services. For example, the user may specify that he or she only wishes to view listings of dealers or other merchants that offer particular types of financing. By conveniently selecting such options (e.g., in one implementation, by simply checking a box on a web page), the users can be automatically presented with a new, filtered listing that lists only those merchants meeting the predetermined criteria the user has specified.

In one exemplary illustrative non-limiting implementation, the financing constraint may be specified by the consumer or other user checking boxes or otherwise selecting particular criteria that match the specialty and/or services or other criteria inputted by the merchants. For example, a consumer who checks a "bad credit" filter criteria will only see listings of merchants who are able to offer financing for purchasers who have bad credit.

In one exemplary illustrative non-limiting implementation, information collected from merchants is standardized so that the merchant database can compactly represent and indicate which merchants have certain predetermined differentiating characteristics. For example, in an information collecting process, an online or other form may be completed with merchant information and used to create or augment the database. Such an online or other form can be completed by the merchant, by someone interviewing the merchant, by someone inspecting or visiting the merchant's location, by customer surveys, or otherwise. The online or other form may list a menu of differentiating characteristics which check boxes. In the case of car dealerships for example, the menu can comprise car dealership related differentiating characteristics such as "body shop?" "bad credit financing?" and the like. In the case of restaurants, the menu could include listings such as "non-smoking section?", "wine list?" and "vegetarian entrees?". Menu options for hotels could include differentiating characteristics such as "swimming pool?", "fitness center?" and "restaurant"? Other implementations are possible In one exemplary illustrative non-limiting implementation, the resulting predefined characteristic profiles generated from the information collection process can be standardized with a defined, limited number of distinguishing characteristics. In the resulting merchant database records, each merchant record may have a characteristic-defining field(s) that compactly represents the responses or other data collection corresponding to that particular merchant. In one exemplary illustrative non-limiting implementation, the database may be searched based on other criteria altogether (e.g., geographic location and keywords). The retrieved results may then be filtered based on user selection of predetermined differentiating criteria. Users can select multiple predetermined differentiating critieria simultaneously to provide Boolean "AND" filtering capabilities. Consumers can turn selected filtering criteria on and off at will to see more or fewer results.

One exemplary illustrative non-limiting implementation calculates the number of retrieved records corresponding to each of the predetermined differentiating criteria available for filtering. The user is presented with a menu showing the predetermined criteria descriptions; the number of retrieved records corresponding to each predetermined criteria; and a check box the user can check to select that predetermined criteria. The user thus can know ahead of time how many listings will be retrieved upon selecting a particular differentiating characteristic. In one exemplary illustrative non-limiting implementation, simply checking a box will automatically initiate a filtering and redisplay action, thereby presenting the user with listings filtered as desired.

In addition to filtering based on a menu of predefined criteria, the exemplary illustrative non-limiting implementation may also permit the user to input keywords that may be used to search the database. By way of non-limiting example, some of those keywords may be mapped, using intelligent mapping, to predefined criteria representing distinguishing characteristics. The exemplary illustrative non-limiting implementation thus may select listings for display based upon filtering, keywords mapped into filtering criteria, generalized keyword searching, or any combination thereof.

One exemplary illustrative non-limiting implementation presents an easy-to-use and easy-to-navigate user interface which allows a user to rapidly and efficiently search to obtain information about merchant offerings. In one exemplary illustrative non-limiting implementation, searching is based at least in part on fixed fields with relatively few, relatively uniform options providing efficient searching of relevant information without the user needing to guess what kind of search terms to input. Such searches can be performed against a structured database and returned very rapidly. Database contents can be obtained through relationship information supplied by the merchants in the course of listing vehicles on a web-based listing service or by any other convenient method including but not limited to surveys, inspection, or other commonly used data collection techniques. Optimally efficient geographical-location services can be combined with a search for other differentiating factors important to consumers (e.g., financing options, stock of goods on hand, foreign language capabilities, and the like) to provide accurate and helpful search results without requiring the consumer to be an expert in computer searching.

In one particular exemplary illustrative non-limiting implementation relating to car dealerships, a web page or other presentation may offer a "find your dealer" function that allows users to search for dealers with various differentiating characteristics including for example "rebates and incentives," "multi-lingual staff," "service centers," and "other services and specialities." Upon selecting such a "find your dealer" function, a user may be presented with a subsequent input screen allowing the user to input one or more keywords (e.g., for example, "financing," "specials" and "service"), as well as a zip code or other geographical locator. In one exemplary illustrative non-limiting implementation, the user may be asked to also insert a distance (e.g., within 25 miles, within 50 miles, within 10 miles), In one exemplary illustrative non-limiting implementation, the server may perform a keyword database search against all listed dealers who fall within the geographic qualification the user specifies. As one example, the search facility can attempt to locate all merchants within a certain mile radius from the user's zip code that have the certain characteristics the user specifies in the keyword field.

In one exemplary illustrative non-limiting implementation, the user may be encouraged to enter keywords that describe what the user wants most from a dealership (e.g., dealership name, dealership features such as financing deals, special offers, loaner cars, shuttle services, body shops, and more). In one exemplary illustrative non-limiting implementation, the keyword search fields may "AND" all keywords the user supplies to provide a Boolean "AND" function. By way of non-limiting example, the user may enter a string of words and the exemplary illustrative non-limiting implementation will search for the combination of words (or, in one example implementation, exact words or phrases if the string is in quotation marks). Such retrieved results can be further filtered based on additional preset criteria.

In one exemplary illustrative non-limiting implementation, the listing page resulting from a search may allow the user to "change your results" by specifying a subset of the retrieved listings based on "services and specialities." For example, the user may specify:

financing characteristics (e.g., "good credit," "bad credit" or "no credit")

"special offers" such as new car specials, used car specials, dealer specials, or manufacturer rebates and incentives, other service features such as service center, factory authorized service center, body shop, customization, detailing, parts and accessories, concierge, deliver options, courtesy shuffle, loaner cars, rental cars, other vehicle inventory (e.g., new, used, certified, classic/collector, conversion vans, handicapped-equipped, hybrid, commercial/fleet, other languages spoken (erg., American Sign Language, Korean, French, German, Italian, Polish, Russian, Spanish, Tagalog, Vietnamese, other)

amenities such as for example, business center, children's play area, comfortable waiting area, handicapped accessible, Internet access, other other Other features and advantages provided by illustrative non-limiting implementations include, by way of example only and not by limitation:

Find Your Dealer: Empower the dealer to tell his story

Visual Enhancements: Help the consumer fall in love with the car

Dealer Keyword Search Tool suggests misspellings and understands synonyms (e.g., Chevy=Chevrolet, P/B=power brakes) based on a dictionary of aliases Dealers are returned, sorted by distance; can also be sorted by other criteria such as Number of Services and Specialties or alphabetically by dealer name Consumer Selection of Services and Specialties: Numbers let consumers know how many dealers have that specific Service or Specialty; Numbers update with each selection to protect consumer from getting a frustrating "no results found" response Exemplary merchant listings may include link to Dealer Detail Page, dealer Photo, contact Information and Call Tracking or Click for Number, Prominent Service and Specialty, Number of Services and Specialties (Click to expand); clicking on the 'View' link expands the listing Dealer Detail page including for example dealer name; dealer address and map link; dealer logo; email popup link; secure credit application link; call/contact tracking number; dealer photo View Inventory Page indicates total inventory, "view inventor" inview/DDA link; inventory statistics; inventory-related services and specialties display; and real time graph of dealer inventory by body style (e.g., convertible, coupe SUV, sedan, truck, van, wagon etc.)

Services and Specialties listed in an easy to read fashion

Dealer can change Services and Specialties anytime online

Languages spoken can be shown in native script

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 4A shows an exemplary illustrative non-limiting home page;

FIG. 4B shows an exemplary illustrative non-limiting Find Your Dealer page or insert;

FIG. 4C shows an exemplary illustrative non-limiting Find Your Dealer search input page;

FIG. 4D shows exemplary illustrative non-limiting Find Your Dealer search results sorted by location;

FIG. 4E shows exemplary illustrative non-limiting Find Your Dealer search results expanded to show Services and Specialities listings;

FIG. 4F shows exemplary illustrative non-limiting Find Your Dealer search results sorted by dealership name;

FIG. 4G shows exemplary illustrative non-limiting Find Your Dealer search results sorted by "# of Services and Specialities":

FIG. 5A shows an exemplary illustrative non-limiting dealer services and specialties input page;

FIGS. 9, 10, 11 and 12 show exemplary illustrative non-limiting item detail pages; and FIGS. 13 and 14 show exemplary illustrative non-limiting inventory search result pages.

DETAILED DESCRIPTION

Figure 1:
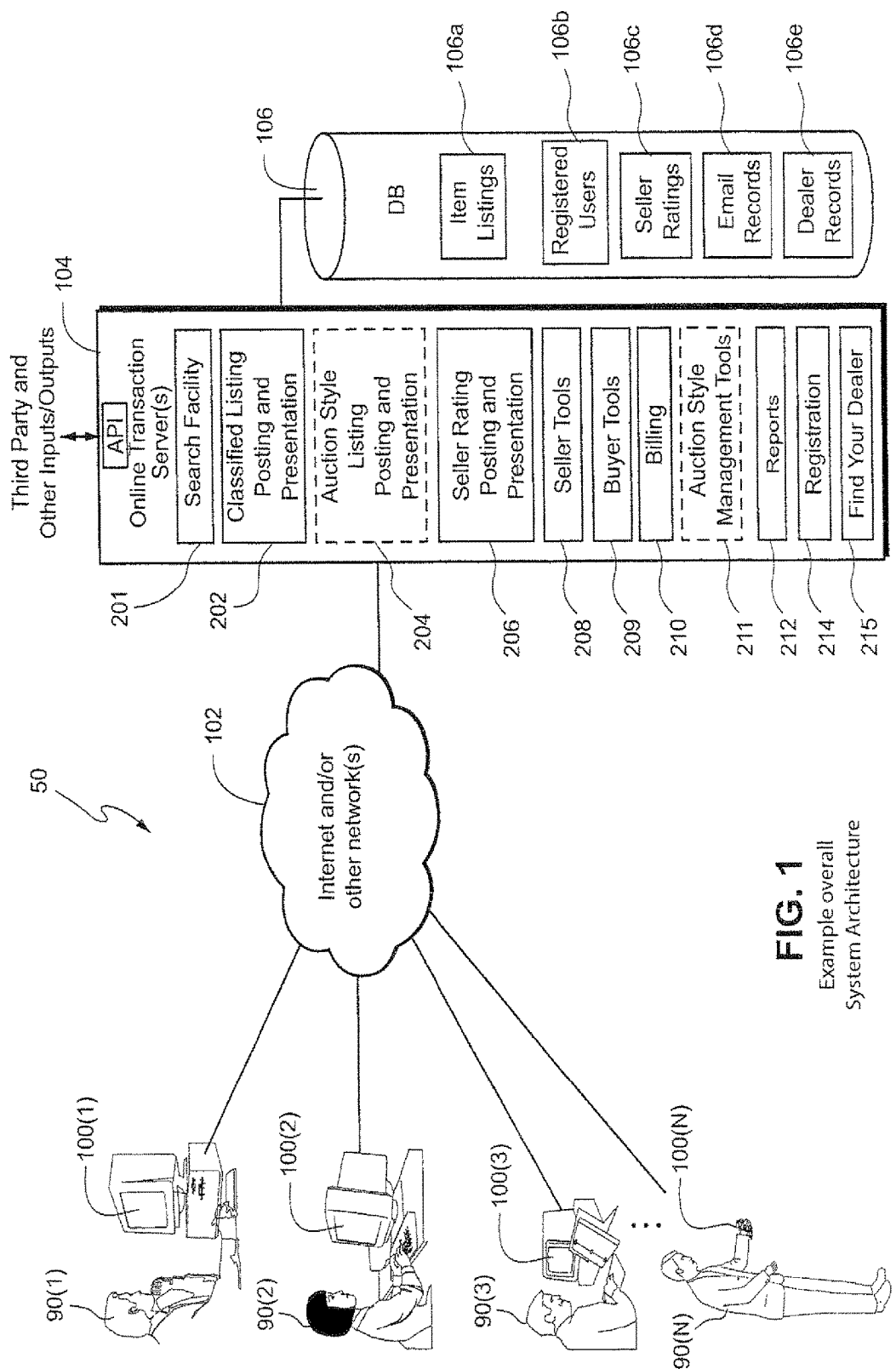
FIG. 1 is a block diagram of an exemplary illustrative non-limiting overall system architecture.
Figure 1A:
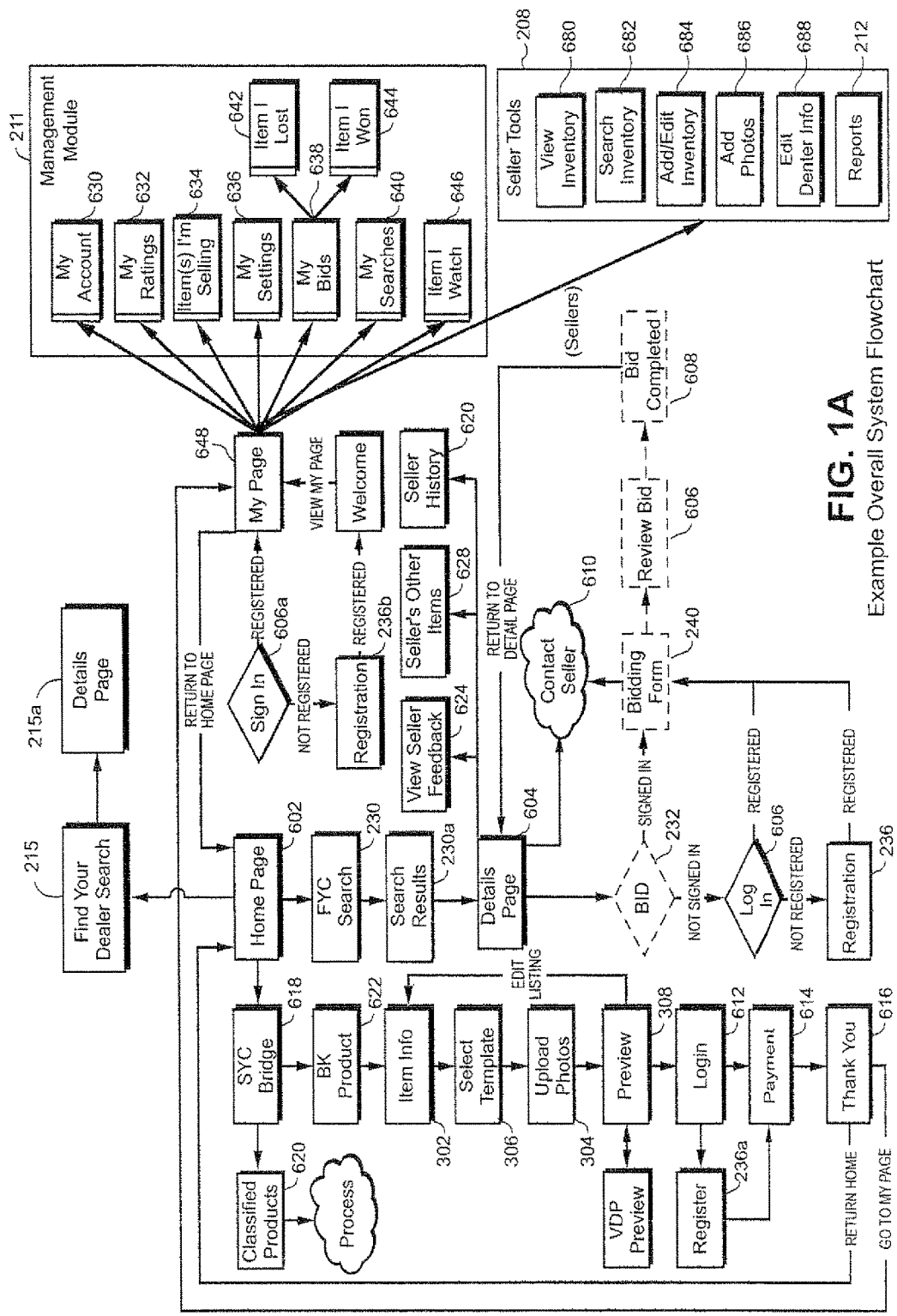
FIG. 1A is a flowchart of an exemplary illustrative non-limiting overall system functionality including a "find your dealer" function.

FIG. 1 shows an exemplary illustrative non-limiting overall online transaction system 50 for providing online classified advertisements and other functionality. FIG. 1A shows an example overall system flowchart of steps and workflow that system 50 performs.

As shown in FIG. 1, any number of remote users 90(1), 90(2), 90(3), . . . 90(N) use browser-based or other appliances 100(1), 100(2), 100(3) . . . 100(N) to communicate via the Internet or other network 102 with an online transaction server(s) 104. Appliances 100(1), 100(2), 100(3), . . . 100(N) may comprise personal computers, cellular telephones, pocket PC's, personal display appliances, web-enabled televisions or set-top boxes, or any type of appliance that can display information and collect and forward user input. Server(s) 104 stores information in one or more databases 106(a), 106(b), 106(c), 106(d)106(a), and deliver stored information in the form of classified listings (202) and, in some implementations, auction-style listings (204) to users 90(1), 90(2), 90(3), . . . 90(N) on demand or otherwise via the network 102 for display on user appliances 100(1), 100(2), 100(3), . . . 100(N).

If the user 90(1) is a seller, the user can insert a classified listing into the database 106a (FIG. 1A, left-hand side, blocks 602, 612-622, 302-308). Other users 90(2), 90(2), 90(3), . . . 90(N) use a search facility 201 (Figure 1A blocks 230, 604) to select and review listings (search results 230a) (e.g., based on geographical proximity and/or other criteria), and may interact with such listings and other displays via keyboards, mice, touch screens or other well-known user input devices (Figure 1A blocks 620, 624, 628). Such real-time user interactivity allows users 90(1), 90(2), 90(3), . . . 90(N) to search for (230) and select particular listings of items being offered for sale (230a). Users 90(1), 90(2), 90(3), . . . 90(N) may also search for dealer information using "Find Your Dealer" search functionality (block 215). In an exemplary illustrative non-limiting implementation, such "Find your Dealer" search functionality searches a database of dealer information (block 106e FIG. 1) and provides a details page 215a listing dealers in the user's geographical area. In the exemplary illustrative non-limiting implementation, the user can narrow his or her search based on keyword searching and/or based on "specialties and services" criteria to be explained below in detail.

Users 90(1), 90(2), 90(3), . . . 90(N) may review selected listings (Figure 1A blocks 232, 240, 606, 608). Server(s) 104 allows sellers to manage their listings (e.g., "My Page" 648) through use of seller tools (208) such as "view inventory," (680) "search inventory," (682) "add/edit inventory," (684) "add photos," (304, 686), "select template" (306), "edit dealer information," (638) and report generation (see Figure 1A blocks 680-688, 212). A management module 211, which allows the seller to manage their listings, can include a "My Account" module 630, a "My Ratings" module 632, a "Item's I'm Selling" module 634, a "My Settings" module 636, a "My Bids" module 638, which includes modules "Item I Lost" 642 and "Item I won" 644, a "My Searches" module 640 and an "Item I Watch" module 646. Server(s) 104 also facilitate direct communication between sellers and potential buyers via email or other forms of communication, to allow and encourage "out of channel" price negotiation and other contact (610). Server(s) 104 also, in one exemplary illustrative non-limiting implementation, allows buyers to rate sellers (206, 632), and provide notification to sellers of such ratings in advance of posting so the sellers can protect their reputation by satisfying dissatisfied buyers who may then withdraw unsatisfactory ratings (Figure 1A block 632, 209). Server(s) 104 also provides billing services (210) to bill for listing services Figure 1A block 614). Auction style management tools 211 and registration tools 214 are provided as well.

In one example illustrative non-limiting implementation, platform 50 is used to provide online retail automotive services to enable dealers and private sellers to list items for sale but other types of goods are also possible including for example real estate, boats, airplanes, or any other kind of item that can be offered for sale. Buyers can have the ability to research sellers' items and past transactions via history reports, inspection service partners and seller ratings. The functionality is that of an open-ended, advertising and transaction mechanism—meaning it is designed to minimize system-imposed rules that could slow down the speed, frequency and efficiency of transactions. The illustrative implementation sacrifices ability to measure conversion rate in some regards to improve ease of use and success for its participants.

Exemplary illustrative online transaction platform 50 provides ease of use, focus on driving local transactions (on and offline), and integrates well with existing/future portfolios of classified listing products 106a, 202. The online platform 50 and associated services can be offered as both stand alone services and as part of a bundle of advertising products (e.g., including online and print classified advertising). Posting 204, managing, reporting 202 and billing 210 are synchronized so each can leverage off the other. An online auction-style listing service can be included or not included depending on the business model or other application usage. The illustrative online platform 50 is simple to use for dealers and private sellers and buyers in all functional areas including for example sign in (606a) registration (236a, 236b), listing, management and bidding.

Exemplary Illustrative "Find Your Dealer" Functionality

Figure 2:
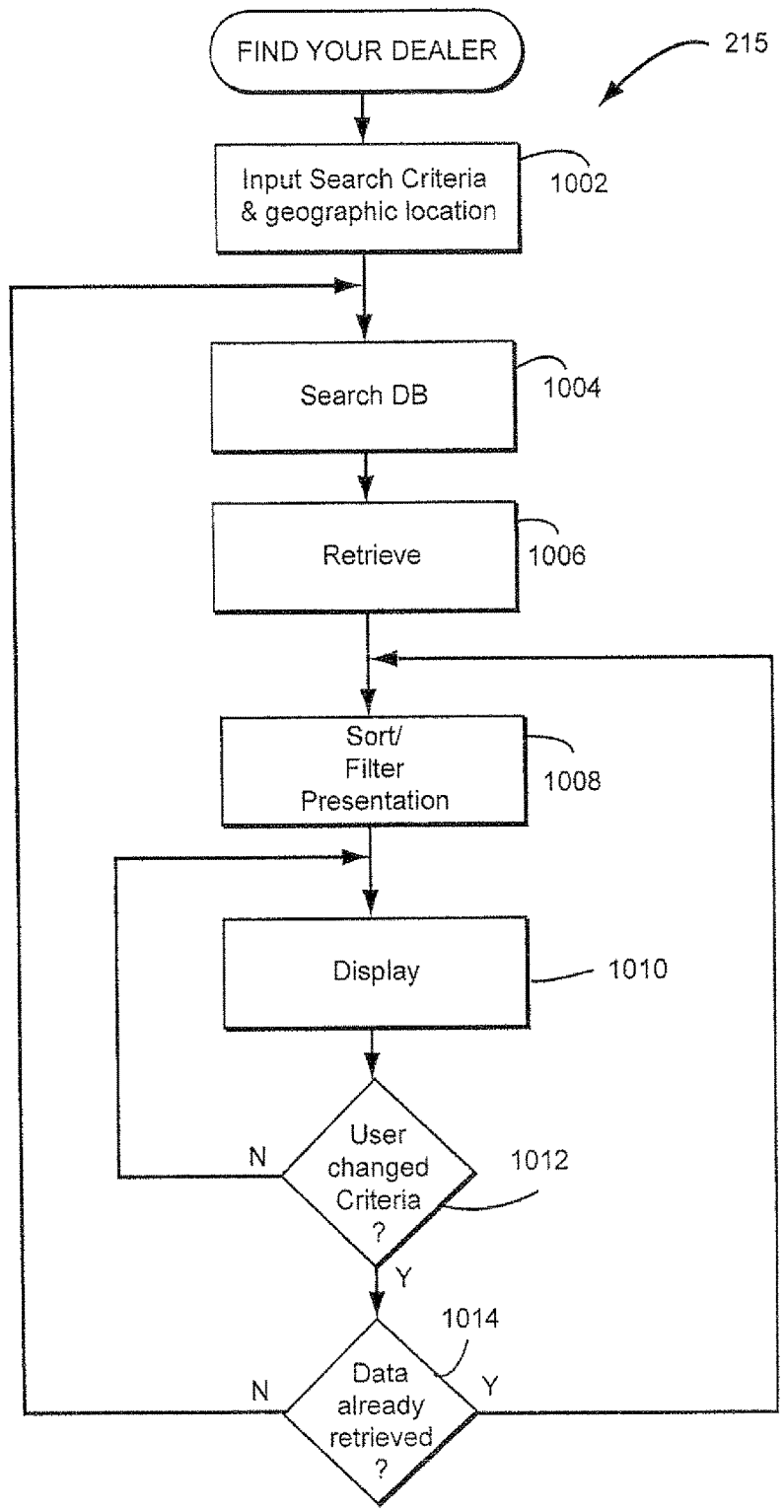
FIG. 2 is a more detailed flowchart of an exemplary illustrative non-limiting "find your dealer" function.
Figure 2A:
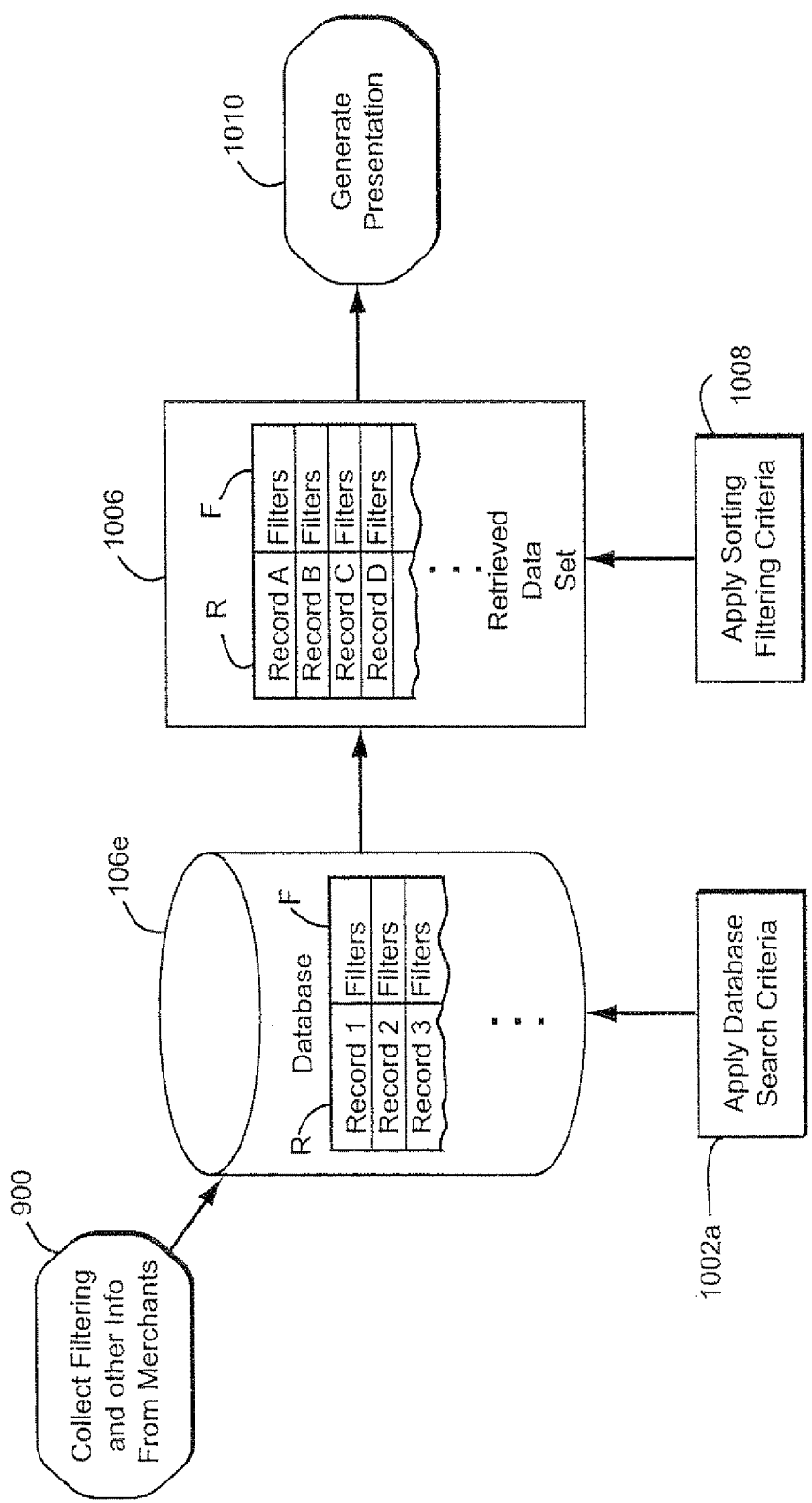
FIG. 2A shows a further schematic illustration of exemplary illustrative non-limiting processes performed by the "find your dealer" function.

FIGS. 2 and 2A are flowcharts of an exemplary illustrative non-limiting "Find Your Dealer" function that allows a consumer or other user to search for dealer information in a database and display results. In an exemplary illustrative non-limiting implementation, an initial step is performed to collect information about merchants including filtering and other information (FIG. 2A block 900). This collected information is stored in database 106e in the form of database records. As will be understood by those skilled in the art, the database records can include any kind of information such as text, photos, videos, links to websites and a variety of other information. In one exemplary illustrative non-limiting implementation, each database record R may include a profile field F including information, e.g., full text filters or bitmapped based indicating whether the merchant associated with that record is associated with that predetermined characteristic. Such profile field information F is available for filtering of retrieved results as will be explained below.

In an exemplary illustrative non-limiting implementation, system 50 ascertains, through input or otherwise, geographical information and search criteria from a user (block 1002). System 50 then performs a search against dealer database 106e (FIG. 2 block 1004; FIG. 2A block 1002a) and retrieves a data set of associated records (block 1006). Sorting and/or filtering criteria are applied to the retrieved records to sort and/or filter them (block 1008). The resulted sorted and filtered records are compiled into results that are usedx to generate a presentation such as for example a display on a web page (block 1010).

In the exemplary illustrative non-limiting implementation, the user is able to change search, sort, filter and/or presentation criteria after reviewing the displayed results in order to refine or better direct the results (block 1012). In the exemplary illustrative non-limiting implementation, some such changed criteria require a new database search and retrieval operation ("N" exit to decision block 1014, blocks 1004, 1006 and following). However, in one exemplary illustrative non-limiting implementation, certain types of changed criteria do not necessitate a new database search but rather can be effected by re-sorting previously retrieved results and/or otherwise re-presenting previously retrieved results in a different way ("Y" exit to decision block 1014, blocks 1008 and following).

For example, clicking on a link or button "View All Specialties and Services" or "Hide All Specialties and Services" can be implemented if desired by re-displaying previously received information differently (e.g., displaying more or less information). Re-presentation of the same information in a re-sorted or re-filtered form can be provided through Javascript or Applets delivered with a web page in some exemplary illustrative non-limiting implementations. Such functionality can provide extremely responsive and user-friendly displays that minimize user wait time even under high load levels. A request by the user to sort results by a different criteria (e.g., alphabetic as opposed to distance) can, if desired, perform a re-sort or a new search and sort, whichever is most efficient and effective. Similarly, user selection of a particular "Specialty or Service" (e.g., "Loaner Car") can initiate a new search of the dealer database, or it can re-filter—based on newly specified filtering criteria—previously retrieved results. Whether or not a new search is performed may depend on a tradeoff between database search time and intermediate result storage space.

Figure 3:
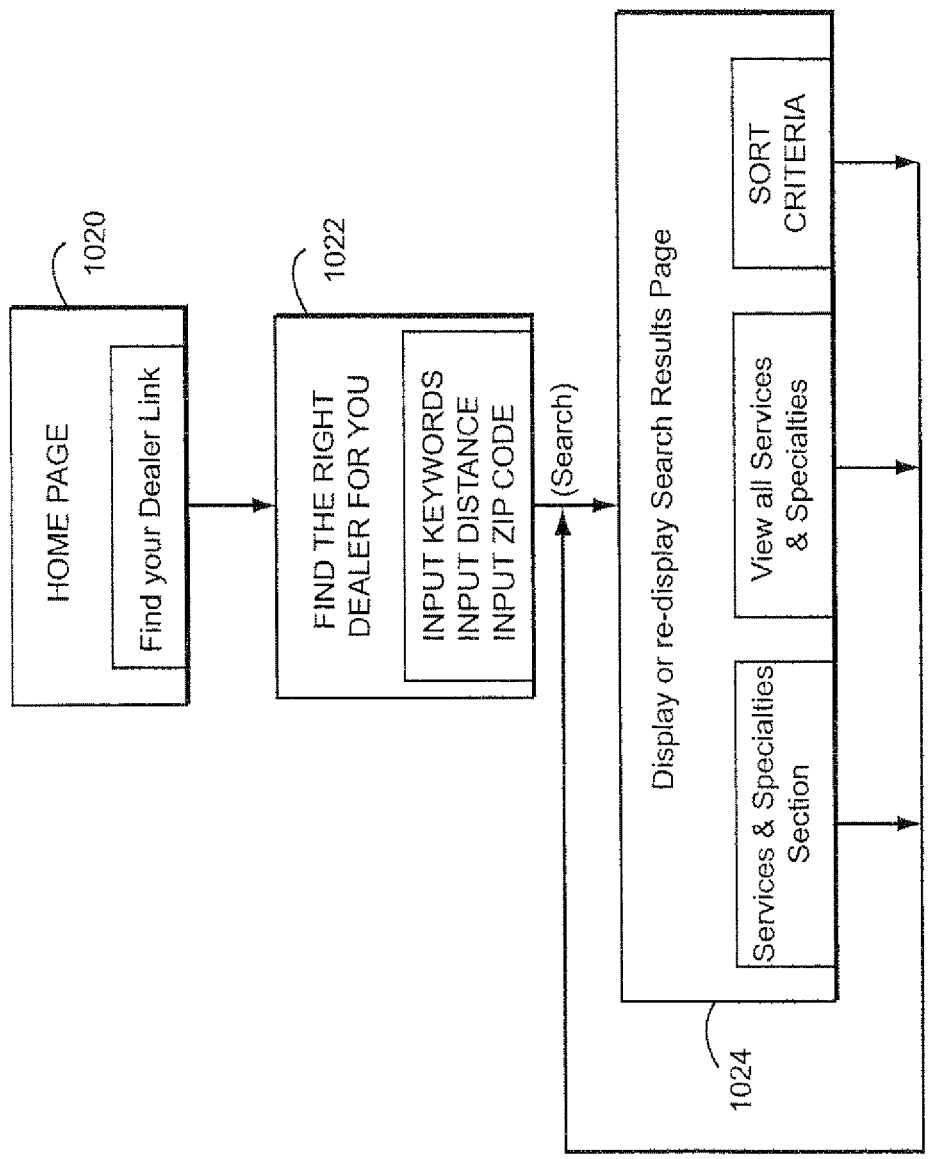
FIG. 3 is a flowchart of exemplary illustrative non-limiting screen or page presentation sequencing.

FIG. 3 shows an exemplary illustrative non-limiting sequencing of Find Your Dealer page displays. From a home or other page (see FIG. 4A), the user may select a "Find Your Dealer" link (see FIG. 4B) to initiate a Find Your Dealer Search (block 1020). A Find Your Dealer input page (see FIG. 4C) may then request the user to input information useful for performing a dealer search (block 1022). In one exemplary illustrative non-limiting implementation, the user may be asked to input a zip code plus other optional information such as distance radius and keyword(s). In one exemplary illustrative non-limiting implementation, the distance radius can be selected from a pulldown menu (e.g., within 10 miles, within 25 miles, within 50 miles, etc.) with a default.

In one exemplary illustrative non-limiting implementation, the user may input one or more keywords that are used for full text searching with automatic synonyms (e.g., Chevy=Chevrolet), Boolean AND or OR functions, and other features. In one exemplary illustrative non-limiting implementation, the user does not need to type "and" and the system 50 will automatically search for dealerships with all the keywords the user enters. For example, the search "financing body shop" will show dealerships that offer financing and have body shops. The user may be encouraged to enter keywords that describe what you want most from a dealership. The user can search by a dealership name or by dealership features such as financing deals, special offers, loaner cars, shuttle services, body shops and more. Example searches might include for example "John Doe Autos service center" or "BMW parts accessories".

The system 50 can implement a basic spelling checker, but may not of course find every misspelling, especially misspelled dealership names. The system can prompt the user with a "did you mean . . . ?" prompt if a dictionary maintained by the system based on database contents indicates the user may have intended to input a different spelling. Quotation marks can be used to find exact phrases. If the user enters a string of words with quotation marks around them, the system in one exemplary illustrative non-limiting implementation will search for dealerships with those exact words and in that exact order. For example, entering "special interest financing" will give results with the words special, interest and financing—in that exact order. The system can automatically strip out all punctuation, and searches need not case sensitive (e.g., so the user will get the same results whether he enters "Service Center", "service center" or "SErVIcE CenTEr."

Figure 4C:
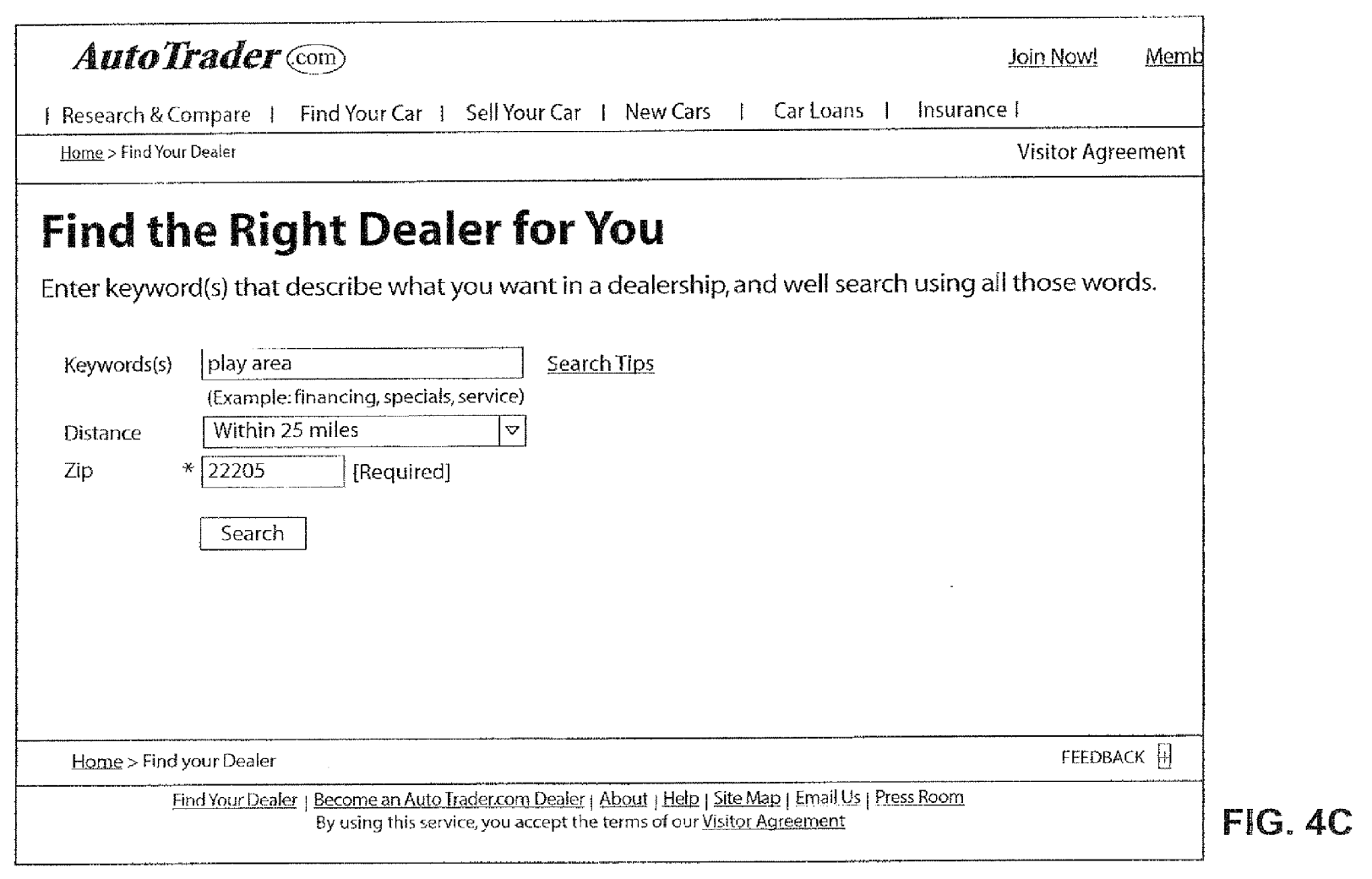

Once the user completes the input form and clicks on "search" (see FIG. 4C), system 50 performed a rapid search against dealer database 106e and retrieves, sorts, filters and displays the results in a results page (block 1024). An example results page is shown in FIG. 4D. This results page may indicate how many dealers are located within the specified geographic criteria and display the results by location (with dealers closest to the user's inputted zipcode being displayed first). Various criteria can be used to further sort retrieved results that meet the same geographic criteria. If the user inputted keywords, then only those listings that include the specified keywords are displayed in the results page.

As can be seen in FIG. 4D, the exemplary illustrative non-limiting results page includes a predetermined menu of potentially distinguishing of differenting characteristics (so-called "Services and Specialties" in this particular example) of additional criteria that can be used to further filter the retrieved data. This menu or checklist is populated with predetermined distinguishing characteristics of pontentially high interest to the consumer such as financing options, services, type of inventory, languages spoken, and other criteria. One example illustrative non-limiting set of such "Services and Specialities" for a car dealership application can comprise the following by way of example only without limitation.

Financing
Good Credit
Bad Credit
No Credit
Services
Service Center
Factory Authorized Service Center
Body Shop
Customization
Detailing
Parts & Accessories
Concierge
Delivery Options
Courtesy Shuttle
Loaner Cars
Rental Cars
Vehicle Inventory
Classic/Collector
Conversion Vans
Handicap-Equipped
Hybrid
Commercial/Fleet
Amenities
Business Center
Children's Play Area
Comfortable Waiting Area
Handicapped Accessible
Internet Access
Languages Spoken
American Sign Language
Chinese
French
German
Italian
Korean
Polish
Russian
Spanish
Tagalog
Vietnamese In the exemplary illustrative non-limiting implementation, a number or other indicator displayed next to each of these criteria indicates how many items retrieved in the current search meet the corresponding criteria. In the example shown, 400 dealerships were returned based on the user's search ("Honda Accord" key terms within 25 miles of zip code 30076) but the page indicates that only 35 of those retrieved items feature a body shop. The checklist or option list thus conveys to the user not only additional search/filter criteria the user may be interested in, but also the number of retrieved listings in the current search that meet such criteria. In the exemplary illustrative non-limiting implementation, clicking on the box next to one of these criteria causes the system 50 to immediate redisplay the results page with only those listings that include the checked characteristic (the box corresponding to the selected characteristic is "checked" with an "X" or a check mark). Clicking the same box again may uncheck the box to cause automatic redisplay without the associated characteristic limitation.

In the exemplary illustrative non-limiting implementation, each time a redisplay occurs based on a new criteria, the totals next to each displayed criteria change based on the current search results including the selected criteria. The user may select multiple such criteria (e.g., "body shop" and "espanol") to perform a Boolean "AND" and display only those listings that meet all selected criteria simultaneously. An "uncheck all" link may be provided to allow the user to efficiently uncheck all selections.

In the exemplary illustrative non-limiting implementation, the data retrieved from database 106e contains sufficient information so that system 50 can filter it based on the user-selected "specialties and services" criteria. This provides an efficient and fast search since the system does not need to search a long string of search criteria. This process of first searching (based e.g., on geographical location and keywords if any) and then filtering (based on user selection of a menu of predetermined criteria) facilitates very fast and responsive searches and result presentation. User selection of predetermined specialties and service criteria in one exemplary illustrative non-limiting implementation can be conveyed in the form of a URL a user's browser automatically generates and sends back to a server.

An exemplary illustrative non-limiting URL including filters for "good credit", "bad credit" and "body shop" is shown below:

---

EXAMPLE URL
/results.jsp?address=22205&distance=25&sortBy=distance&keywords=&pageSize=25&filters=%2CGood+Credit%2CNo+Credit%2CBody+Shop

---

In the example above, the first part of the URL (omitted based on USPTO restrictions on included active URLs in patent specifications) may designated the name of a server on the Internet or other computer network from which the information is to be retrieved. The next portion may reference a Java Server Page, which as well known to those skilled in the art, provides JavaServer Pages (JSP) technology provides a simplified, fast way to create dynamic web content, More information about JSP is readily available from Sun Microsystems or a variety of other sources. See for example "The GlassFish Project: Open Source Java EE 5 Application Server Implementation" and "Java Web Services Developer Pack J2EE 1.4 SDK", both incorporated herein by reference. As can be seen from reviewing the remainder of the example URL, the "results" field specifies a database search based on location (in this case 25 miles from the centroid of zip code 22205) and a sort by distance and the occurrence of keyboards (if specified). The pagesize parameter specifies 25 listings per page. Filters in this particular example are based on predetermined distinguishing characteristics of "Good Credit" AND "No Credit" AND "Body Shop." This relatively simply command interface to a World Wide Web server provides flexible, fast and efficient search, sorting and filtering capabilities that the user can select and change in an easy and user friendly manner.

As shown in FIG. 3, a link may be provided to selectively display or hide the various "Specialties and services" associated with each displayed listing. Selecting "display specialties and services" can expand each of the already-displayed listings to provide a listing of applicable specialties and services for each listing as shown in FIG. 4E. Such a feature can be implemented, in a world wide web context, with Javascript, Applets or any other convenient technology so that no additional search or even server request is needed and representation occurs entirely within the user's browser view.

Figure 5:
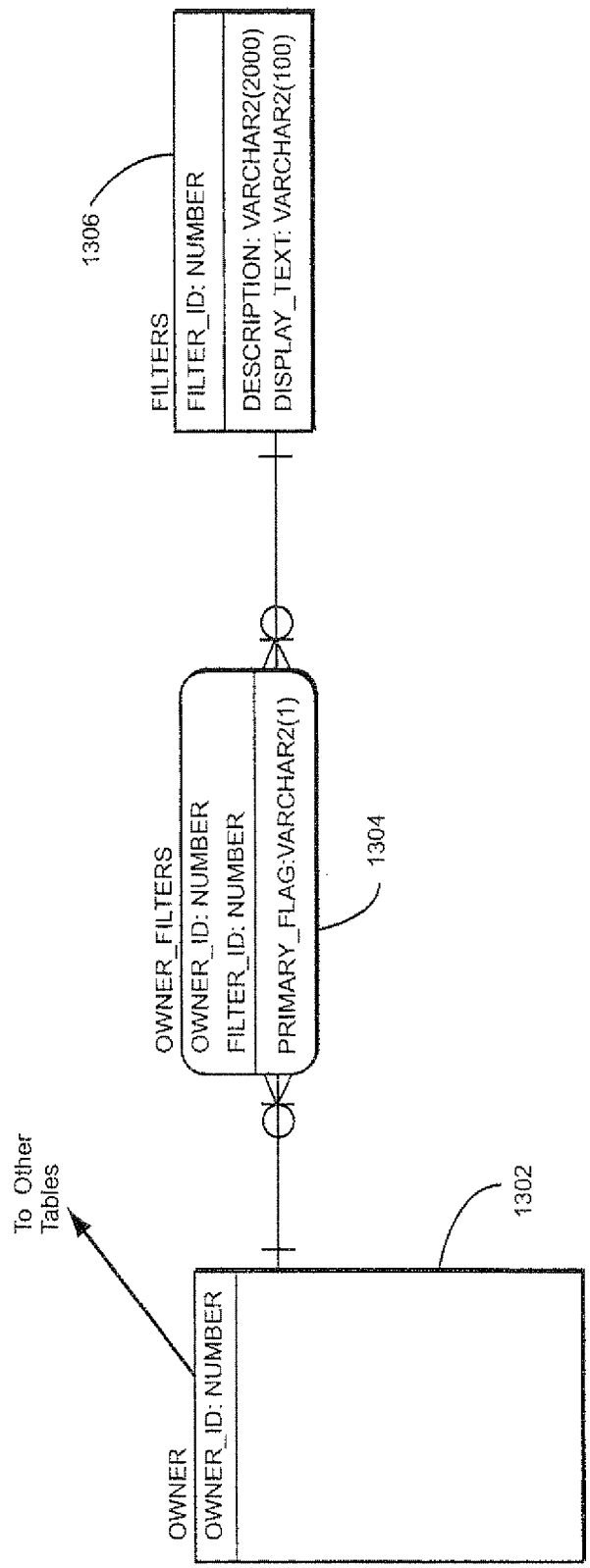
FIG. 5 shows an exemplary illustrative non-limiting database structure.

FIG. 5 shows an exemplary partial structure for merchant database 106e. In the exemplary illustrative non-limiting implementation a master or key "owner" table 1302 is used to index into a number of different conventional database tables (e.g, security, photos, text, logs, etc.). One of the indexed tables is an owner filter table 1304 that in turn indexes an owner filter record 1306. The owner filter record 1306 includes a filter-ID number, description and display text. Such records may encode the predetermined filtering characteristics described above. Any number of such tables may be used to provide efficient database lookup.

FIG. 5A shows an exemplary illustrative non-limiting form 1308 a merchant or other data input operator can use to specify the filtering information contents. In one exemplary illustrative non-limiting implementation, merchants are empowered to input and change their own differentiating characteristics. Such changes to their profiles can be made quickly and easily by simply calling up page 1308 and checking or unchecking different menu options. Some merchants can opt out altogether. In one exemplary illustrative non-limiting implementation, there may be a maximum number of such characteristics a merchant can list, but merchants who are willing to pay a premium price can increase that number if desired. In other exemplary illustrative non-limiting implementations, a third party surveyor or reviewer may maintain control over the profile data entries to maintain them and/or ensure they are accurate. In still other non-limiting implementations, consumers, merchants and third party watchdogs or any subcombination thereof can have input as to what filtering characteristics are associated with which merchants.

Figure 6:
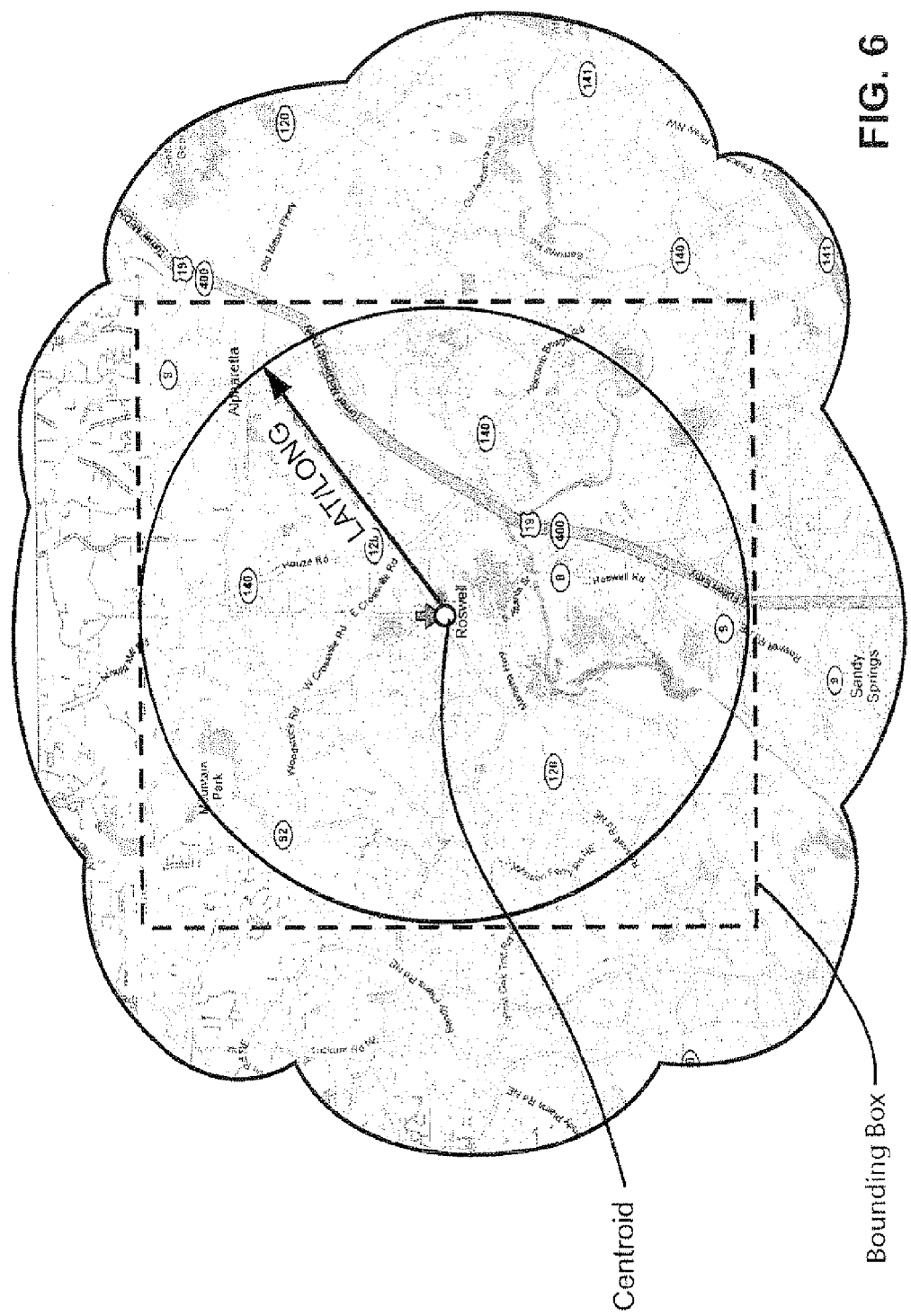
FIG. 6 shows an exemplary illustrative non-limiting geographical search function.
Figure 7:
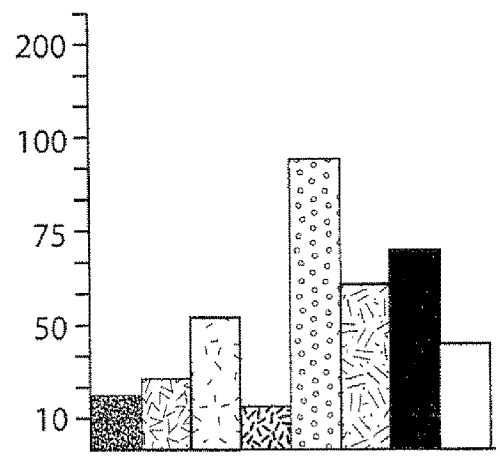
FIG. 7 shows an exemplary illustrative non-limiting dynamic inventory display.

FIG. 6 shows an example illustrative non-limiting geographic locator ("geosearch") algorithm used to search and sort merchants by distance. In the example shown, a centroid of the user's inputted zip code is calculated in latitude and longitude, and the system 50 then a bounding box is calculated (in latitude and longitude coordinates) is calculated based on the user's inputted "distance from" parameter. These latitude and longitude search coordinates are used to perform a comparison against geographical information stored within database 106e to locate all merchants within the specified geographic locality. Such retrieved records can then be sorted based on how close the merchant is to the user's zip code centroid and/or other factors. Such geosearches can be performed in combination with other search criteria (e.g., "all car dealers with more than 10 minivans in stock on site within 10 miles of me"). The exemplary illustrative non-limiting implementation provides a dynamic inventory function (see FIG. 7) that can be employed in conjunction with other search criteria to provide such useful and efficient search results. In more detail, at least some of the merchants listed within database 106e may also maintain updated inventory listings with system 50. System 50 may thus "know" what each of these merchants has in the way of inventory at any given time. Such inventory information can be advantageously displayed dynamically (e.g., as shown in FIG. 7) on a merchant by merchant basis, and may also be used as search criteria. For example, the "inventory stats" may include a breakdown of the number of each of various different types of products in inventory at any given time (e.g., convertible, coupe, hatchback, sedan, SUV, truck, van and wagon for car dealerships). Such inventory information can be, in one exemplary illustrative non-limiting implementation, combined with geographic and other search or filtering criteria to provide very useful search results for consumers shopping for a new item. The inventory statistics may change dynamically as the merchant updates database 106e (e.g., as items are sold to customers and new items come into stock for sale). Techniques such as open source Cewolf can be used to build and display the charts automatically. Cewolf can be used inside a Servlet/JSP based web application to embed complex graphical charts of all kinds into a web page. It provides a full featured tag library to define chart properties. A data collection Java class and a chart customization Java class can be used to support such functionality.

Figure 8:
FIG. 8 shows an exemplary illustrative non-limiting dealer detail page.

Referring back to FIG. 4D, the "dealership search results" page provides useful information about each returned merchant including for example a dealership photo, contact information, a listing of the number of services and specialties (the details of which can be hidden or displayed as desired), and a prominent service and specialty In addition, at least some such merchant listings include a "more info" link that a user can select to access more detail including inventory information pertaining to that specific merchant. Clicking on the "more info" link can bring up a merchant detail page such as shown in FIG. 8. Such a merchant detail page can include for example the merchant's name, the merchant's address and map link or other geographic locator, a logo, an email popup link, a secure credit application link, a call tracking or click for number link, and a dealer photo. In addition, inventories can also be displayed, in one exemplary illustrative non-limiting implementation, on the merchant detail page such as shown in FIG. 8. Such detail pages can include a variety of different kinds of information and include an ability to view and search through inventory in stock.

As shown in FIG. 8, a particular car dealership has 134 vehicles in stock. The first three vehicles are featured with thumbnail photos, and the total inventory statistics are displayed both graphically and numerically. The inventor can be displayed for example from least expensive to most expensive or in any other desired order. The user can click on arrow buttons (backwards or forwards) to scroll through the available inventory (e.g., clicking on "next" displays photos of the next three items in a dynamic fashion with the photos "sliding" to the left across the page in an almost animated way). The page can also include a listing of "specialities and services" presented in an easy to read and understand listing format.

Figure 9:
Figure 10:
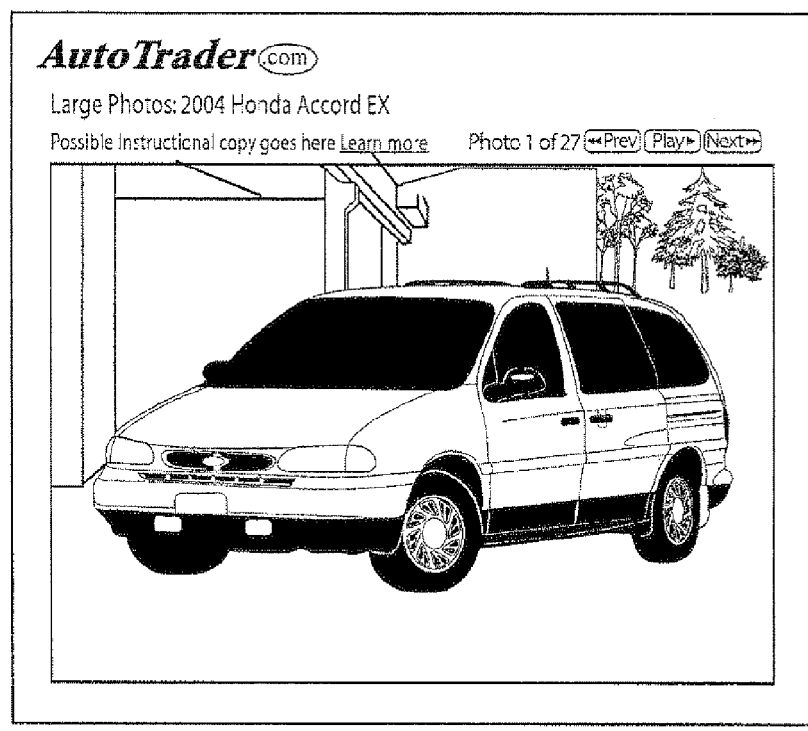
Figure 11:
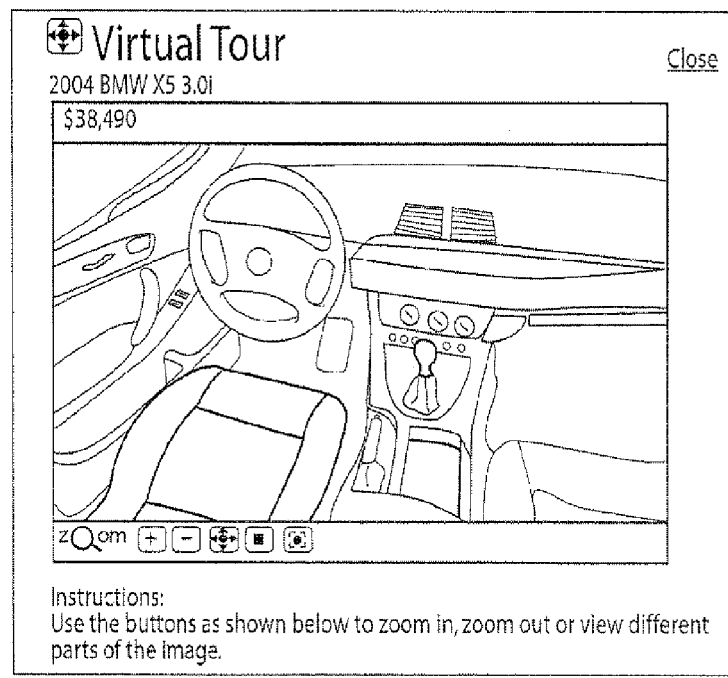

Clicking on a photo or on an associated link takes the user to a detailed view of that particular item (see for example FIG. 9). Such an item detail page can include any number of photos, a written description of the item, and if desired, an "email seller" form that allows the user to send an email to the seller asking a question—thereby potentially beginning a sales negotiation or at least creating a "lead." Such a page can also allow a user to access a slide show of large photos (see FIG. 10) and/or a virtual tour (movie) of the vehicle (see FIG. 11) with 3D virtual camera control, zoom or the like. Other types of movies (see FIG. 12) can also be accessed and played in a conventional fashion.

Figures 12, 13:
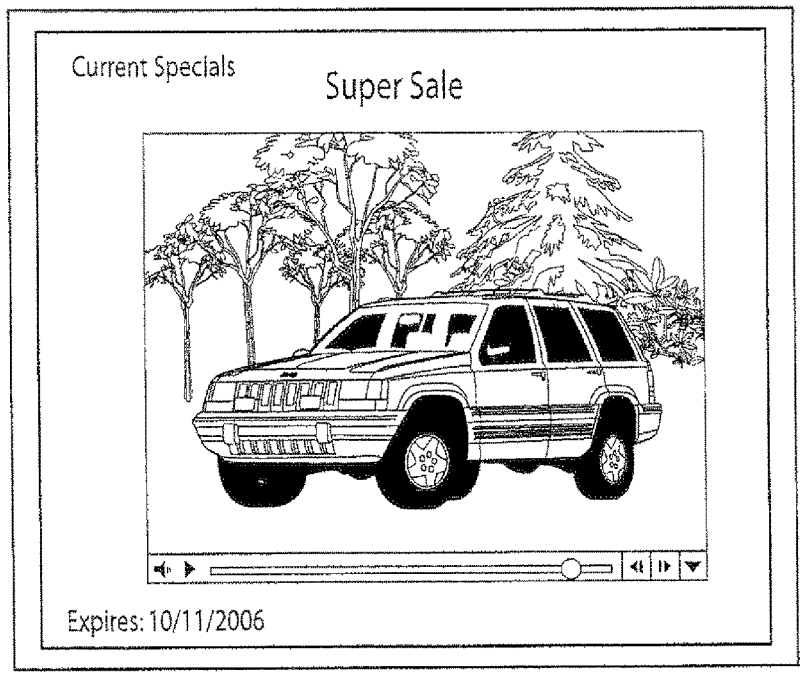

FIGS. 13 and 14 shows search functionality provided in connection with the inventory detail page described above. In one exemplary illustrative non-limiting implementation, it is possible for a user to search through inventory to locate particular items of interest. For example, FIG. 13 shows a display of "special" items, whereas FIG. 14 shows a display of items that match the user's inputted criteria. Thus, a user can look at all items in the inventory of a particular merchant, or just particular items of a type the user specifies.

Exemplary Illustrative Non-Limiting Find Your Dealer Search Methodology:

1. Receive Values—A user can enter up to 5 types of values for Owner search: zip, distance, current page, an optional set of keywords, and an optional set of filters.

2. Setup Search—After receiving these 5 parameters from the user, the system begins to setup the search parameters that will be passed to the database. One exemplary illustrative non-limiting implementation follows these steps to setup the search:

a. To limit the search results returned—compute the "bounding-box" latitude and longitude maximum and minimum coordinates for the search. The box is computed by taking the latitude and longitude of the center of the user's zip and creating a maximum area square around that center point. The limiting distance is given by applying the user's requested distance to all sides of the square. The maximum square will be limited to a 300 mile "radius" in each direction by the user interface. This computation gives 4 values for min/max lat/long. The system restricts the search by these 4 values to retrieve a smaller set of results.

b. To limit the amount of data needed to be retrieved, system 50 executes the search against a limited "view" of data. This view returns a very small selection of the Owner document data—just enough to compute the search and sort the documents correctly. The view in one exemplary illustrative non-limiting implementation will contain only the following fields—not the entire Owner Document:
   i. owner id
   ii. latitude
   iii. longitude c. Exemplary conventional search engines provides the capability to sort by Owner Name and Number of Benefits directly in the search engine. If either of these sorts are selected, it is possible to add the appropriate parameters to have the search engine order the documents.

3. Check Cache—The system checks a server-specific cache based on the search parameters to see if it has executed a similar search. If it has executed this search before (probably from a paging link)—then the system will return the existing results and skip to Step 8.

4. Execute Search—If the search wasn't found in the cache, the system will execute the search the following parameters. The initial search results will be returned by the search engine.
   c. View=OwnerSearch
   d. Keyword match with Keyword parameter values
   e. Filters by a "contains" string search
   f. Lat/Long boxed by 4 coordinates.
   g. Sort by Owner Name or Number of Benefits if appropriate.

5. Retrieve Navigators—The first thing system 50 retrieves via the search engine is a set of Navigators that provide aggregated information (metadata) about the results of the search. These Navigator counts are placed in an Aggregate container object that will be shared with the DWSI search system. The navigators returned to the UI are:
   1. Total Doc Count
   a. A Set of Filters with the count of each aggregate's value. (stored in a HashSet in an Aggregate/Navigators Java object).

6. Compute Distance—If the user selected a Distance sort, the system 50 needs to retrieve all documents for a given search. System 50 computes the distance from the center of the user's zip to the lat/long of the owner. The system 50 then sorts the documents based on this distance value. This sorted List is cached separately from the regular search object.

7. Add to Cache—Once the system has the sorted list of all owner ids from the search engine view, it places this search result in the server-level cache for retrieval from other similar searches (Mostly from paging.)

8. Retrieve Owners—The system next retrieves all the owner information for the user's selected page of results. It is possible to obtain this Owner info from a SearchResultProxy class that will cache owners that have been previously seen in using functionality in other portions of the system. The system 50 asks for the set of Owners (usually 20) for the current page. The Proxy class pulls the owners from cache and retrieves all non-cached owners with one additional combined query.

9. Return Results—The system returns to the user interface a SearchResult object which contains:
   1. A List of the 20 owners to display on the page.
   a. A Navigators object that contains:
   i. The Total Doc Count
   ii The HashSet of all Filters→Counts for the filter section Exemplary Illustrative Non-Limiting Item Inventory Search Methodology 1. Receive Values—This search receives a set of parameters that define an inventory search.
   a. OwnerId
   b. Make
   c. Model
   d. Bodystyle
   e. Spotlight Cars Only
   f. Type (New/Used/Cert)
   g. Start Year
   h. End Year
   i. Start Price
   j. End Price
   k. Current Page
   l. # per Page
   m. Sort By—Price, Year, Maker Model, Color, Mileage. All ASC/DSC 2. Setup Search—Searches are performed against the an inventory view which will return just the values that of interest. All parameters plus sorting will be passed to the search engine.

3. Check Cache—The system checks a server-specific cache based on the search parameters to see if it has executed a similar search. If it has executed this search before (probably from a paging link)—then it returns the existing results and skip to Step 7.

4. Execute Search—If the search wasn't found in the cache—the system executes the search to the search engine. The current page and # per page will be used to determine the starting value for retrieving results from the search engine.

5. Retrieve Navigators—The first thing the system retrieves from the search engine is a set of Navigators that gives aggregated information (metadata) about the results of the inventory search. The system takes these Navigator counts and places them in an Aggregate container object that will be shared with the Find Your Dealer search system. The aggregates are used by the inventory search form, and other functions. The navigators we will return to the user interface are:
   a. Total Doc Count
   b. Avg Price Navigator
   c. Set of Makes→Count d. Set of Models→Count
e. Set of BodyStyles→Count
f. Set of Spotlights→Count
g. Set of Type (NUC)→Count 6. Add to Cache—Once the system has the results of the search, it places this search result in the server-level cache for retrieval from other similar searches (Mostly from paging.)
7. Retrieve Listings—The system now retrieves all the car inventory Listing information for the user's selected page of results. The exemplary illustrative non-limiting implementation rolls through the Listings set and parses the car information into CarDetail objects. This parsed information can be cached if desired. The system parses the values that are for the user's current page of results.
8. Return Results—The system returns to the user interface a SearchResult object which will contain:
   a. A List of the Inventory(CarDetail) objects to display on the page.
   b. A Navigators object that contains the previously requested Navigator information.

The search may also be able to "skin" or "style" its results in multiple views (HTML, JS, XML) for different applications. These results can be run through various skinning methods to determine how to output the final view of the inventory.

This exemplary illustrative search technique utilizes navigators to retrieve basic information about the dealer's inventory without retrieving all car details. Initial basic information includes makes, models, body styles, spotlights, minimum and maximum price, number of vehicles (document count), and type (new/used/certified). A Java object holds this information.

While the technology herein has been described in connection with exemplary illustrative non-limiting embodiments, the invention is not to be limited by the disclosure. For example, although the exemplary illustrative non-limiting implementation emphasizes car dealerships, the system could be used to help users locate any type of merchant or service provider providing any type of goods or services for sale or otherwise, including but not limited to real estate, restaurants, hotels, marine equipment, construction equipment or services, personal services, office equipment, or any other kind of merchants. Although the exemplary illustrative non-limiting technology herein provide a world wide web based presentation system via the Internet and client server architectures, any type of architecture over any type of network or other communications path using any type of data transmission protocol could be used instead. While the predetermined filtering criteria described above is primarily in conjunction with "specialties and service", any type of distinguishing characteristics could be used. The invention is intended to be defined by the claims and to cover all corresponding and equivalent arrangements whether or not specifically disclosed herein.

We claim:

1. A method of facilitating searches for car dealerships while providing predictive filtering results, comprising:
   (a) ascertaining a geographical location associated with a user;
   (b) using at least one processor, automatically retrieving information from a car dealership database stored on a non-transitory storage device, the stored car dealership database providing geographical and non-geographical information relating to plural car dealerships, the stored non-geographical information relating to the plural car dealerships being customized by individual car dealership, the processor automatically retrieving car dealership information from the database in response to the ascertained geographical location to identify car dealerships in proximity to said ascertained geographical location,;
   (c) receiving, with the at least one processor, user input from the user specifying user selection of at least one non-geographical filtering constraint;
   (d) automatically, with the at least one processor, filtering said retrieved car dealership information based at least on the input from the user specifying the at least one non-geographical filtering constraint as compared against the non-geographical information relating to the car dealerships customized by individual car dealership;
   (e) automatically providing, using the at least one processor for presentation to the user, a filtered set of retrieved car dealerships that are in proximity to said ascertained geographical location and meet the at least one non-geographical filtering constraint specified by the user input;
   (f) automatically presenting, using the at least one processor, the quantity of car dealerships of the filtered set of car dealerships which meet additional non-geographical filtering constraints not yet specified by user input;
   (g) receiving additional input from the user specifying user selection of at least one additional non-geographical filtering constraint;
   (h) automatically providing, using the at least one processor for further presentation to the user, a further filtered set of car dealerships that are in proximity to said ascertained geographical location and simultaneously meet the at least one non-geographical filtering constraint and the at least one additional non-geographical filtering constraint;
   (i) subsequent to (h), automatically presenting, using the at least one processor, the quantity of car dealerships of the further filtered set of car dealerships which meet additional filtering constraints not yet specified by user input; and
   (j) using the at least one processor, iterating (g)-(i) to present a successively-filtered set of car dealerships that satisfy successively-received user filtering inputs whereby the successive presentation presents car dealership quantity information predictive of further filtering constraint results before receiving additional user input specifying said further filtering constraints.

2. The method of claim 1 wherein said filtering comprises filtering based on languages spoken.

3. The method of claim 1 wherein said filtering comprises filtering based on financing options provided.

4. The method of claim 1 wherein said filtering comprises filtering based on physical site capabilities.

5. The method of claim 1 further including dynamically presenting, with said filtered retrieved information, a graphical depiction of inventory available at each presented car dealership.

6. The method of claim 1 further including presenting, to the user, a menu of non-geographical filtering constraints and allowing the user to check or uncheck any or all of said non-geographical filtering constraints listed on said menu.

7. The method of claim 1 wherein said presenting includes sending the user a web page.

8. The method of claim 1 wherein said predetermined set of filtering constraints comprises differentiating characteristics, and said retrieving further includes keyword searching.

9. The method of claim 1, further comprising:
(k) changing the filtering constraints to further refine the filtered retrieved information after the results are presented to the user; and
(l) presenting the further refined retrieved information to said user.

10. A system for facilitating searches for car dealerships while providing predictive filtering results, comprising:
(a) means for ascertaining geographical location information associated with a user;
(b) means for automatically retrieving information from a car dealership database stored on a non-transitory storage device, the stored car dealership database providing geographical and non-geographical information relating to plural car dealerships, the stored non-geographical information relating to the plural car dealerships being customized by individual car dealership, including means for automatically retrieving car dealership information from the database in response to the ascertained geographical location to identify car dealerships in proximity to said ascertained geographical location;
(c) means for receiving input from the user specifying user selection of at least one non-geographical filtering constraint;
(d) means for automatically, with at least one processor, filtering said retrieved car dealership information based at least on the input from the user specifying the at least one non-geographical filtering constraint as compared against the non-geographical information relating to the car dealerships customized by individual car dealership;
(e) means for automatically providing, using the processor for presentation to the user, a filtered set of retrieved car dealerships that are in proximity to said ascertained geographical location and meet the at least one non-geographical filtering constraint specified by the user input; including automatically presenting the quantity of car dealerships of the filtered set of the car dealerships which meet additional non-geographical filtering constraints not yet specified by user input;
(f) means for receiving additional input from the user specifying user selection of at least one additional non-geographical filtering constraint;
(g) means for automatically providing, using the processor for further presentation to the user, a further filtered set of retrieved car dealerships that are in proximity to said ascertained geographical location and simultaneously meet the at least one non-geographical filtering constraint and the at least one additional non-geographical filtering constraint, and automatically presenting the quantity of car dealerships of the further filtered set of car dealerships which meet additional non-geographical filtering constraints not yet specified by user input; and
(h) means for iterating to present a successively-filtered set of car dealerships that satisfy successively-received non-geographical filtering user inputs whereby the successive presentation presents car dealership quantity information predictive of further filtering constraint results before additional receiving user input specifying said further filtering constraints to present to the user ahead of time how many listings will be retrieved upon selecting a particular filtering constraint.

11. The system of claim 10, further comprising:
means for changing the filtering constraints to further refine the filtered retrieved information after the results are presented to the user.

12. A consumer search website operating on a server, comprising:
a car dealership database stored on a server, the stored car dealership database providing geographical and non-geographical information relating to plural car dealerships, the stored non-geographical information relating to the plural car dealerships being customizable by individual car dealership;
a data collector that ascertains geographical location associated with a user and receives input from the user specifying user selection of at least one non-geographical filtering constraint and keywords;
a filter coupled to said search engine, said filter automatically filtering said retrieved information based at least on the input from the user specifying the at least one non-geographical filtering constraint as compared against the non-geographical information relating to the car dealerships customized by individual car dealership; and
a processor to automatically provide, for presentation to the user, a filtered set of retrieved car dealerships that are in proximity to said ascertained geographical location and meet the at least one non-geographical filtering constraint specified by the user input, including automatically presenting the quantity of car dealerships of the filtered set of car dealerships which meet additional non-geographical filtering criteria the user has not yet specified, wherein
additional input is received by said data collector from the user specifying user selection of at least one additional non-geographical filtering constraint,
the processor automatically provides, for further presentation to the user, a further filtered set of car dealerships that are in proximity to said ascertained geographical location and simultaneously meet the at least one non-geographical filtering constraint and the at least one additional filtering constraint, and automatically presents the quantity of car dealerships of the further filtered set of care dealerships which meet additional filtering criteria not yet specified by user input, and
the processor receives additional input from the user and further presents successively-filtered sets of retrieved car dealerships that are in proximity to said ascertained geographical location and simultaneously satisfy successively-received user filtering inputs to successively present car dealership quantity information predictive of further filtering constraint results before additional receiving user input specifying said further filtering constraints.

13. The website as in claim 12 wherein said filtering criteria include languages spoken, financing options, and physical facility differentiating factors.

14. The website of claim 12 further including an inventory module that dynamically analyzes merchant inventory and presents graphical depictions of available inventory.

15. The website of claim 12 wherein said presentation system presents said filtered search results with links that allow a user to select and see detailed presentation information including photos of available inventory for each of plural car dealerships.

16. The website of claim 12 wherein said car dealership database includes a full text filter table.

17. The website of claim 12 wherein said presentation system sends web pages over the Internet to user browsers.

18. The website of claim 12 wherein said filtering criteria comprises at least one of financing characteristics including at least one of good credit, bad credit and no credit; special offers including at least one of new car specials, used car specials, dealer specials, and manufacturer rebates and incentives; service features including at least one of a service center, a factory authorized service center, a body shop, customization, detailing, parts and accessories, concierge, deliver options, courtesy shuttle, loaner cars and rental cars; vehicle inventory including at least one of new, used, certified, classic/collector, conversion vans, handicapped-equipped, hybrid and commercial/fleet; and languages spoken.

19. The consumer search website operating on the server of claim 12, wherein the processor is further structured to change the filtering constraints in response to user input to further refine the filtered retrieved information without necessitating a new database search but instead by re-sorting previously retrieved results, and re-presenting the further refined retrieved information to said user.

\* \* \* \* \*